United States Patent
Savkar et al.

[11] Patent Number: 5,838,940
[45] Date of Patent: Nov. 17, 1998

[54] METHOD AND APPARATUS FOR ROTATING ACTIVE INSTRUCTIONS IN A PARALLEL DATA PROCESSOR

[75] Inventors: Sunil Savkar, New York, N.Y.; Michael C. Shebanow, Plano, Tex.; Gene W. Shen, Mountain View; Farnad Sajjadian, Sunnyvale, both of Calif.

[73] Assignee: Fujitsu Limited, Japan

[21] Appl. No.: 926,185

[22] Filed: Sep. 8, 1997

(Under 37 CFR 1.47)

Related U.S. Application Data

[63] Continuation of Ser. No. 457,049, Jun. 1, 1995, abandoned.
[51] Int. Cl.$^6$ .................................................. G06F 9/40
[52] U.S. Cl. ...................... 395/392; 395/376; 395/381; 395/390; 395/582
[58] Field of Search ................................... 395/376, 381, 395/383, 390, 392, 582

[56] References Cited

U.S. PATENT DOCUMENTS

| | | | |
|---|---|---|---|
| 4,654,781 | 3/1987 | Schwartz et al. | 711/219 |
| 4,916,652 | 4/1990 | Schwartz et al. | 364/748 |
| 5,127,093 | 6/1992 | Moore, Jr. et al. | 395/375 |
| 5,247,628 | 9/1993 | Grohoski | 395/375 |
| 5,295,249 | 3/1994 | Blaner et al. | 395/375 |
| 5,497,496 | 3/1996 | Ando | 395/800.23 |
| 5,519,841 | 5/1996 | Sagar et al. | 395/412 |
| 5,519,864 | 5/1996 | Martell et al. | 395/650 |
| 5,559,975 | 9/1996 | Christie et al. | 395/375 |
| 5,564,118 | 10/1996 | Steely, Jr. et al. | 395/375 |

FOREIGN PATENT DOCUMENTS

| | | |
|---|---|---|
| 0363176 | 4/1990 | European Pat. Off. . |
| 0605874 | 7/1994 | European Pat. Off. . |
| 3236524 | 4/1983 | Germany . |
| 4216905 | 7/1993 | Germany . |

OTHER PUBLICATIONS

Kuga, Morihiro, Murakami, Kazuaki, & Tomita, Shinji, DSNS (Dynamically–hazard–resolved, Statically–code–scheduled, Nonuniform Superscalar): Yet Another Superscalar Processor Architecture, *Computer Architecture News*, vol. 19, No. 4, Jun., 1, 1991, pp. 14–25.

*Primary Examiner*—Robert B. Harrell
*Assistant Examiner*—Saleh Najjar
*Attorney, Agent, or Firm*—Fenwick & West LLP

[57] ABSTRACT

In a microprocessor, apparatus and method coordinate the fetch and issue of instructions by rotating multiple, fetched instructions into an issue order prior to issuance and dispatching selected of the issue ordered instructions. The rotate and dispatch block including a mixer for mixing newly fetched instructions with previously fetched and unissued instructions in physical memory order, a mix and rotate device for rotating the mixed instructions into issue order, an instruction latch for holding the issue ordered instructions prior to dispatch, and an unrotate device for rotating non-issued instructions from issue order to physical memory order prior to mixing with newly fetched instructions.

During the fetch cycle, multiple instructions are simultaneously fetched from storage in physical memory order and rotated into a PC-related issue order within the rotate and dispatch block. During the next clock cycle, selected ones of the previously fetched and rotated instructions enter the issue cycle, a new set of instructions are fetched in physical memory order, the previously fetched and rotated instructions which were not issued are rearranged into physical memory order and mixed in physical memory order with the newly fetched instructions, together all fetched and non-issued instructions are rotated into issue order prior to the next issue cycle, and so forth until all instructions have passed through the pipeline.

6 Claims, 17 Drawing Sheets

METHOD AND APPARATUS FOR ROTATING ACTIVE INSTRUCTIONS IN A PARALLEL DATA PROCESSOR

This application is a continuation of patent application Ser. No. 08/457,049 filed on Jun. 1, 1995 now abandoned. This application also is related to: (1) patent application Ser. No. 08/456,746 filed on Feb. 14, 1995, now abandoned for continuation patent application Ser. No. 09/025,511 filed on Feb. 18, 1998; (2) patent application Ser. No. 08/388,602 filed on Feb. 14, 1995, now issued U.S. Pat. No. 5,689,673; (3) patent application Ser. No. 08/388,389 filed on Feb. 14, 1995, now abandoned for continuation patent application Ser. No. 08/517,229 filed on Aug. 21, 1995; (4) patent application Ser. No. 08/388,606 filed on Feb. 14, 1995, now abandoned for continuation patent application Ser. No. 08/518,549 filed on Aug. 23, 1995, now abandoned for continuation patent application Ser. No. 08/921,104 filed on Aug. 29, 1997; (5) patent application Ser. No. 08/388,364 filed on Feb. 14, 1995, now abandoned for continuation patent application Ser. No. 08/516,230 filed on Aug. 17, 1995, now issued U.S. Pat. No. 5,740,414; (6) patent application Ser. No. 08/390,885 filed on Feb. 14, 1995, now abandoned for continuation patent application Ser. No. 08/398,299 filed on Mar. 3, 1995, now abandoned for continuation patent application Ser. No. 08/476,419 filed on Jun. 7, 1995, now issued U.S. Pat. No. 5,659,721; 08/478,025 filed on Jun. 7, 1995, now issued U.S. Pat. No. 5,651,124; 08/483,958 filed on Jun. 7, 1995, now issued U.S. Pat. No. 5,649,136; 08/473,223 filed on Jun. 7, 1995, now issued U.S. Pat. No. 5,644,742; 08/484,795 filed on Jun. 7, 1995, now issued U.S. Pat. No. 5,673,426; and 08/487,801 filed on Jun. 7, 1995, and its divisional patent application Ser. No. 08/872,982; (7) patent application Ser. No. 08/397,893 filed on Mar. 3, 1995, now abandoned for continuation patent application Ser. No. 08/522,567 filed on Sep. 1, 1995, now issued U.S. Pat. No. 5,675,759; (8) patent application Ser. No. 08/397,891 filed on Mar. 3, 1995, now abandoned for continuation patent application Ser. No. 08/523,384 filed on Sep. 5, 1995, now issued U.S. Pat. No. 5,745,726; (9) patent application Ser. No. 08/397,911 filed on Mar. 3, 1995, now issued U.S. Pat. No. 5,632,028; (10) patent application Ser. No. 08/398,284 filed on Mar. 3, 1995, now abandoned for continuation patent application Ser. No. 08/522,845 filed on Sep. 1, 1995; (11) patent application Ser. No. 08/398,066 filed on Mar. 3, 1995, now abandoned for continuation patent application Ser. No. 08/524,294 filed on Sep. 5, 1995, now issued U.S. Pat. No. 5,708,788; (12) patent application Ser. No. 08/397,910 filed on Mar. 3, 1995; (13) patent application Ser. No. 08/398,151, now abandoned for continuation patent application Ser. No. 08/956,251 filed on Oct. 22, 1997; (14) patent application Ser. No. 08/397,800 filed on Mar. 3, 1995, now issued U.S. Pat. No. 5,638,312; (15) patent application Ser. No. 08/397,809 filed on Mar. 3, 1995; (16) patent application Ser. No. 08/397,810 filed on Mar. 3, 1995; (17) patent application Ser. No. 08/397,912 filed on Mar. 3, 1995, now issued U.S. Pat. No. 5,637,353; and (18) patent application Ser. No. 08/398,299. The above patent applications are or will be assigned to the same assignee as herein, and are hereby incorporated herein by reference in their entirety.

FIELD OF THE INVENTION

This invention relates generally to data processors which issue and execute multiple instructions in parallel, and more particularly to a method and apparatus for rotating queued and fetched instructions into an issue order for parallel processing in a microprocessor during execution cycles.

BACKGROUND OF THE INVENTION

In a typical scalar microprocessor, instructions are issued and executed in a serial or scalar manner. That is, instructions are issued and executed by the microprocessor one at a time in the order in which instructions are indexed by a program counter. While this method of execution is effective, it in many cases is not optimal since many instruction sequences in a computer program are independent of other instruction sequences. In such instances, various instruction sequences can be executed in parallel to optimize performance. Recent techniques for parallel execution of instructions include register renaming, speculative execution, and out-of-order execution.

Register renaming is a technique utilized by processors in which the processor remaps the same architectural register to a different physical register in order to avoid stalling instruction issues. This technique requires the maintenance of a greater number of physical registers than would otherwise be warranted architecturally. The processor must, therefore, continuously monitor the status of the physical register resources including how many of the physical registers are in use at a given moment, to which architectural registers are the various physical registers mapped, and which of the physical registers are available for use. In order to accomplish this task, the processor maintains a list of physical registers ("freelist") that are not in use. When an instruction is issued, the processor remaps the architectural destination register to one of the registers on the freelist. The selected physical register is then removed from the freelist. Whenever the renamed physical registers are no longer needed, these physical registers are marked free by adding them to the freelist pool. Those physical register resources, which are missing from the freelist, are considered to be "in use" or otherwise unavailable to the processor for further mapping. Where the resultant register of an instruction is to be used as a source (architectural) register for a sequentially following instruction, the source register is mapped to a renamed physical register from the freelist. In order for the processor to use the correctly associated physical register, a rename map is continuously maintained by the processor which identifies which architectural registers are mapped to which physical registers. All sequentially subsequent instructions that refer to a sequentially earlier instruction's architectural register should use the renamed physical register.

In the case where the architectural registers are renamed, provision must exist for efficiently restoring the correct state of the architectural registers when the processor does a backup to a checkpoint due to a mispredicted branch instruction, or, when a sequentially later instruction modifies the architectural register before the detection of an execution exception due to a sequentially earlier instruction.

Speculative execution is a technique utilized by processors in which the processor predicts a next branch target address for a next instruction where data is unavailable to evaluate a condition for a conditional branch. By using speculative execution, processor delays which would otherwise occur in waiting for the data needed to evaluate the condition, are avoided. Whenever there is a misprediction, the processor must be returned to the state which existed prior to the branching step and the correct branch must be identified in order to proceed with execution of the correct sequence of instructions. In order to recover the state of the processor after a misprediction, one technique that has been utilized is called checkpointing wherein the machine state is stored (or checkpointed) after every speculative instruction.

Out-of-order execution is a technique utilized by processors in which the processor includes multiple execution units which are issued instructions sequentially but which may complete execution of instructions non-sequentially due to varying execution times of the instructions. It is this concept of issuing and executing instructions in parallel, out of sequence, which underscores both the advantage and difficulties associated with parallel processors.

As discussed above, various techniques for issuing multiple instructions utilize predictions (speculative execution, register renaming, or out-of-order execution) to determine the correct number of instructions to be issued at one time and thereafter to fetch from a predicted location. If the prediction is correct, time is saved; if not, then the wrong instructions are fetched and would need to be thrown away.

In a superscalar machine, the fetch, queue, and issue instructions are complicated by the utilization of of an issue window larger than one instruction fetched and issued and processing of programs with branch instructions. Processing is further complicated by the fetching of instructions in a physical order necessitating instruction rotation or ordering for issue in a program order. Processing is further complicated by issuing multiple instructions out of a queue in the same cycle that up to the same number of instructions must be inserted into the queue, replacing the instructions to be issued in the same cycle. Therefore, there is a need in parallel processors to develop an efficient method and apparatus for coordinating the issuance and execution of instructions to avoid mispredictions and associated losses of time and resources. There is a further need for an optimal solution for keeping the queue of instructions ahead of the instruction execution flow such that cycles are minimized with bubbles in instruction issue due to the inability of the machine to keep up with the issue instructions into the machine.

SUMMARY OF THE INVENTION

In accordance with the present invention, a method and apparatus is provided for issuing multiple instructions in parallel by rotating instructions into an issue order from a memory specific physical order to coordinate the fetch and issuance of instructions and avoid delays in processing which may be occasioned by data processors utilizing superscalar.

The data processing system, which includes the present invention, includes a central processing unit which sends requests to and receives information from data and instruction caches. A memory management unit connects an external permanent storage unit to data and instruction caches, receives requests from the central processing unit to access addressable locations in the storage unit, accesses the requested addresses in the storage unit, and transfers the requested data and instructions to a fetch unit within the central processing unit wherein the instructions and data are operated upon. The fetch unit includes a rotate and dispatch block for rotating fetched instructions into an issue order prior to issuance and dispatching selected instructions. The rotate and dispatch block includes a mixer for mixing newly fetched instructions with previously fetched and unissued instructions in physical memory order, a mix and rotate device for rotating the mixed instructions into issue order, an instruction latch for holding the issue ordered instructions prior to dispatch, and an unrotate device for rotating non-issued instructions from issue order to the original memory specific physical order prior to mixing with newly fetched instructions.

In order to accommodate superscalar execution, the processor implements a pipeline for processing multiple instructions which includes the minimum of a fetch, issue, and execute stage. During the fetch cycle, multiple instructions are simultaneously fetched from storage in the original memory order and rotated into issue order. During the next clock cycle, selected ones of the previously fetched and rotated instructions enter the issue cycle, a new set of instructions are fetched in physical memory order, the previously fetched and rotated instructions which were not issued are rearranged into physical memory order and mixed in physical memory order with the newly fetched instructions; together all fetched and non-issued instructions are rotated into issue order prior to the next issue cycle, and so forth until all instructions have passed through the pipeline.

DETAILED DESCRIPTION OF THE PREFERRED EMBODIMENT

Figure 1:
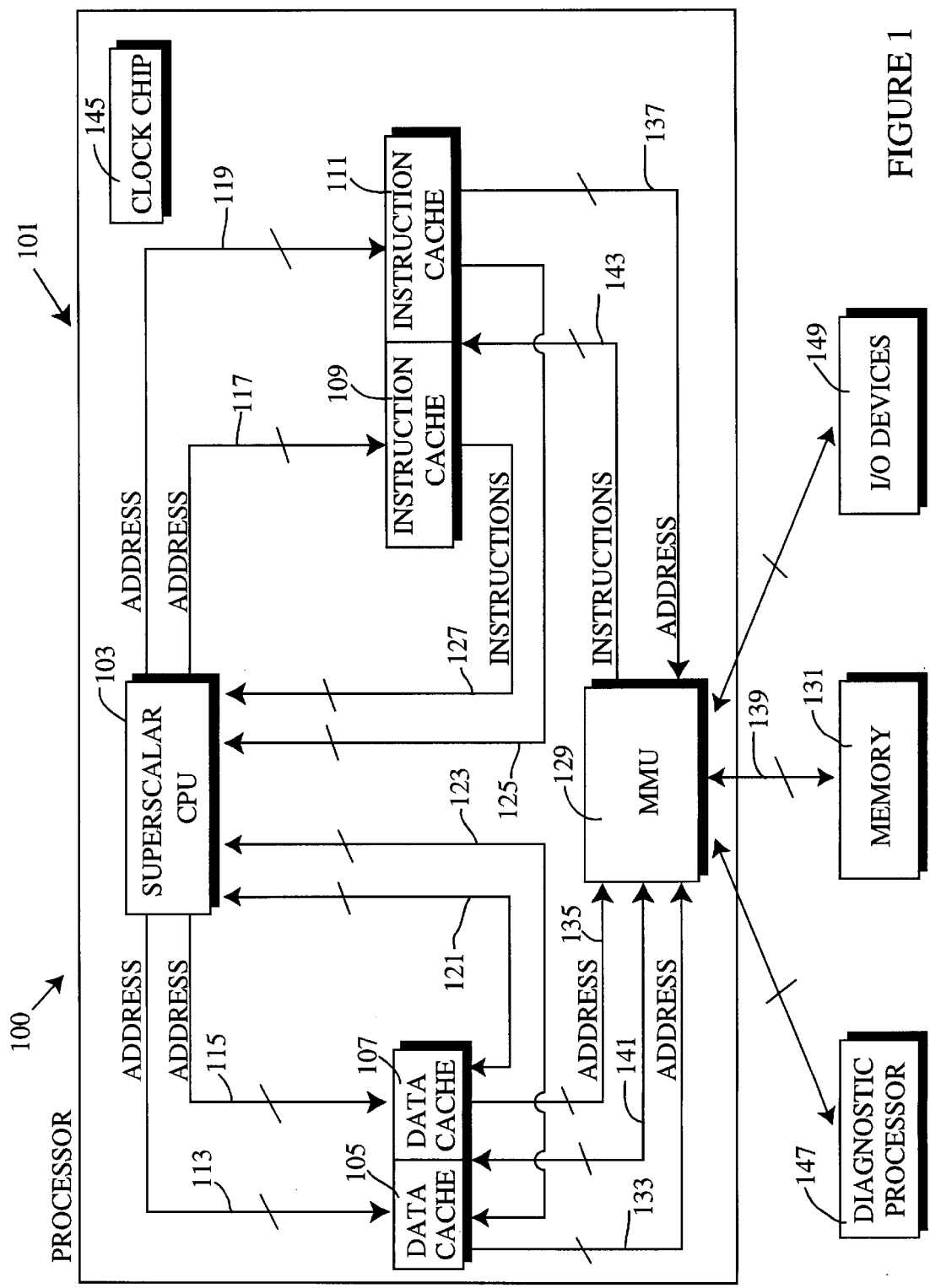
FIG. 1 is a block diagram of a data processor.

With reference to FIG. 1, there is shown a block diagram of conventional processor system 100 mounted with processor 101, such as the R1 Processor which is mounted on a ceramic Multi-Chip Module (MCM), wherein the present invention is implemented. Within processor 101, superscalar CPU chip 103 interfaces with two 64 Kbyte data and two 64 Kbyte instruction cache chips 105, 107, 109, 111 by sending requests for access to storage over 128-bit address busses 113, 115, 117, 119, receiving and sending data over 128-bit data busses 121, 123, and, receiving instructions over 128-bit instruction busses 125, 127. In processor system 100, memory management unit (MMU) 129 connects external permanent storage unit 131, such as those which are commercially available, to data and instruction caches 105, 107, 109, 111, receives requests to access addressable locations in storage unit 131 over 128-bit address busses 133, 135, 137, accesses the requested addresses in storage unit 131 through 128-bit bus 139, and transfers the requested data and instructions through 128-bit data and instruction busses 141, 143. MMU 129 may additionally manage communication between processor 101 and external devices, such as diagnostic processor 147 and input/output (I/O) devices 149. By utilizing a multi-chip module, CPU 103 may utilize large caches and high bandwidth busses that total 256 bits of address and 256 bits of data. Clock chip 145 provides clock signals within processor 101 to control and synchronize communication between the respective elements within and external to processor 101. Processor 101 may be implemented with the SPARC® V9 64-bit instruction set architecture and achieves a maximum instruction issue rate of four instructions per clock cycle by exploiting instruction-level parallelism with superscalar instruction issue, register renaming, and dataflow execution techniques.

Figure 2A:
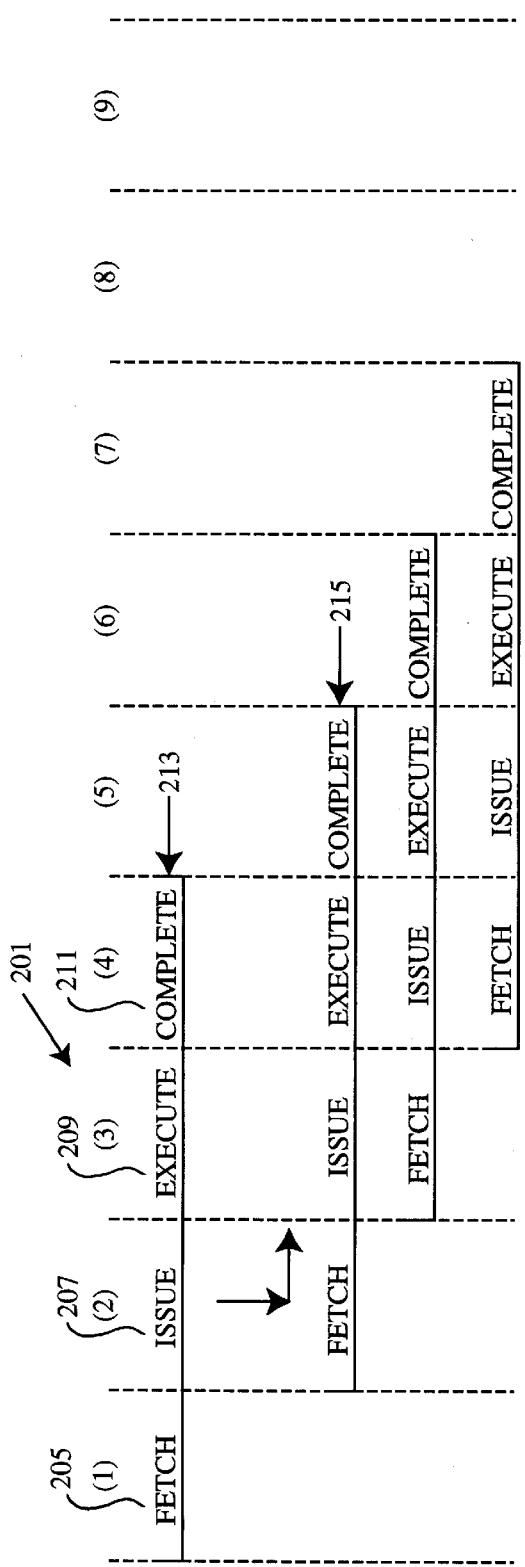
FIG. 2A is a diagram illustrating a conventional four-stage pipeline implemented by the processor of FIG. 1 for fixed-point instructions.
Figure 2B:
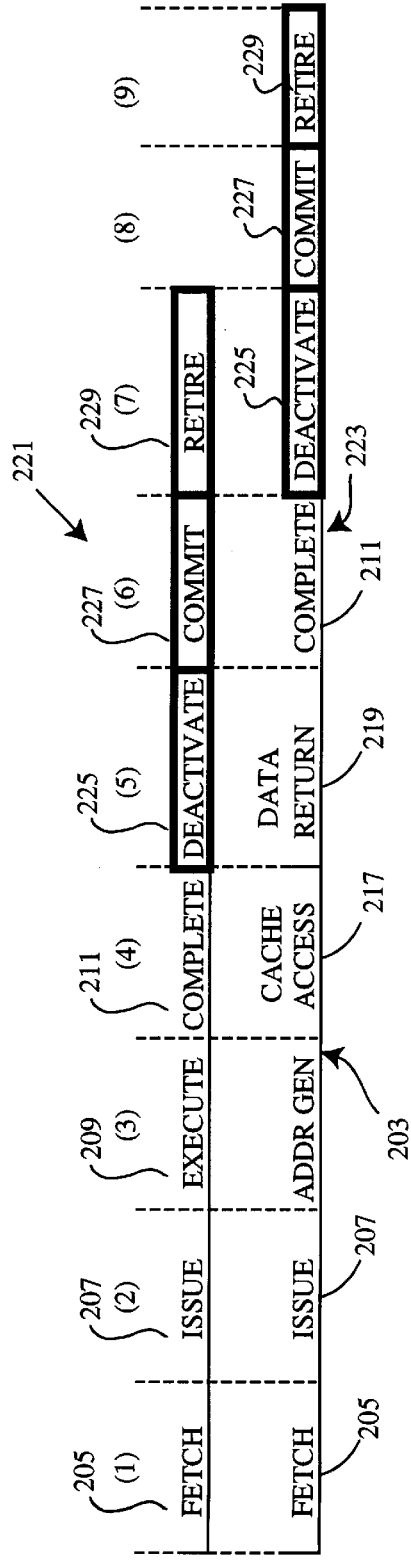
FIG. 2B is a diagram illustrating a modified seven-stage and nine-stage pipeline implemented by the processor of FIG. 1 for fixed point and load instructions, respectively.

Referring to FIG. 2A, conventional four-stage pipeline 201 for processing instructions is shown to include fetch, issue, execute, and complete stages 205, 207, 209, 211 and may be utilized to process fixed-point instructions. In order to load the pipeline of superscalar, degree four processor 101, a first set of four instructions may be fetched during instruction stage 213, a second set of four instructions may be fetched during instruction stage 215 which begins after fetch stage 205 is completed for instruction cycle 213, and so forth, until the pipeline is fully loaded with four sets of instructions or until no additional instructions remain to be executed. For processing each load instruction, conventional six-stage pipeline 203 shown in FIG. 2B includes fetch, issue, address generating (ADDR GEN), cache access, data return, and complete stages 205, 207, 203, 217, 219, 211. Pipeline 203 is filled in the same manner as pipeline 201 and is fully loaded when a total of four sets of six instructions are in the pipeline. In order to accommodate out-of-order execution, processor 101 implements modified pipelines 221, 223 for processing fixed-point and load instructions, respectively, which include deactivate, commit, and retire stages 225, 227, 229. During deactivation stage 225, an instruction is deactivated after it has completed execution without error. During commit stage 227, an instruction is committed if it has been deactivated and all previous instructions have been deactivated. During retire stage 229, an instruction is retired when all machine resources consumed by the instruction have been reclaimed. Prior to the commit and retire stages, sufficient information is retained by processor 101 to restore the machine state in the event that execution errors or branch mispredicts are detected.

Figure 3:
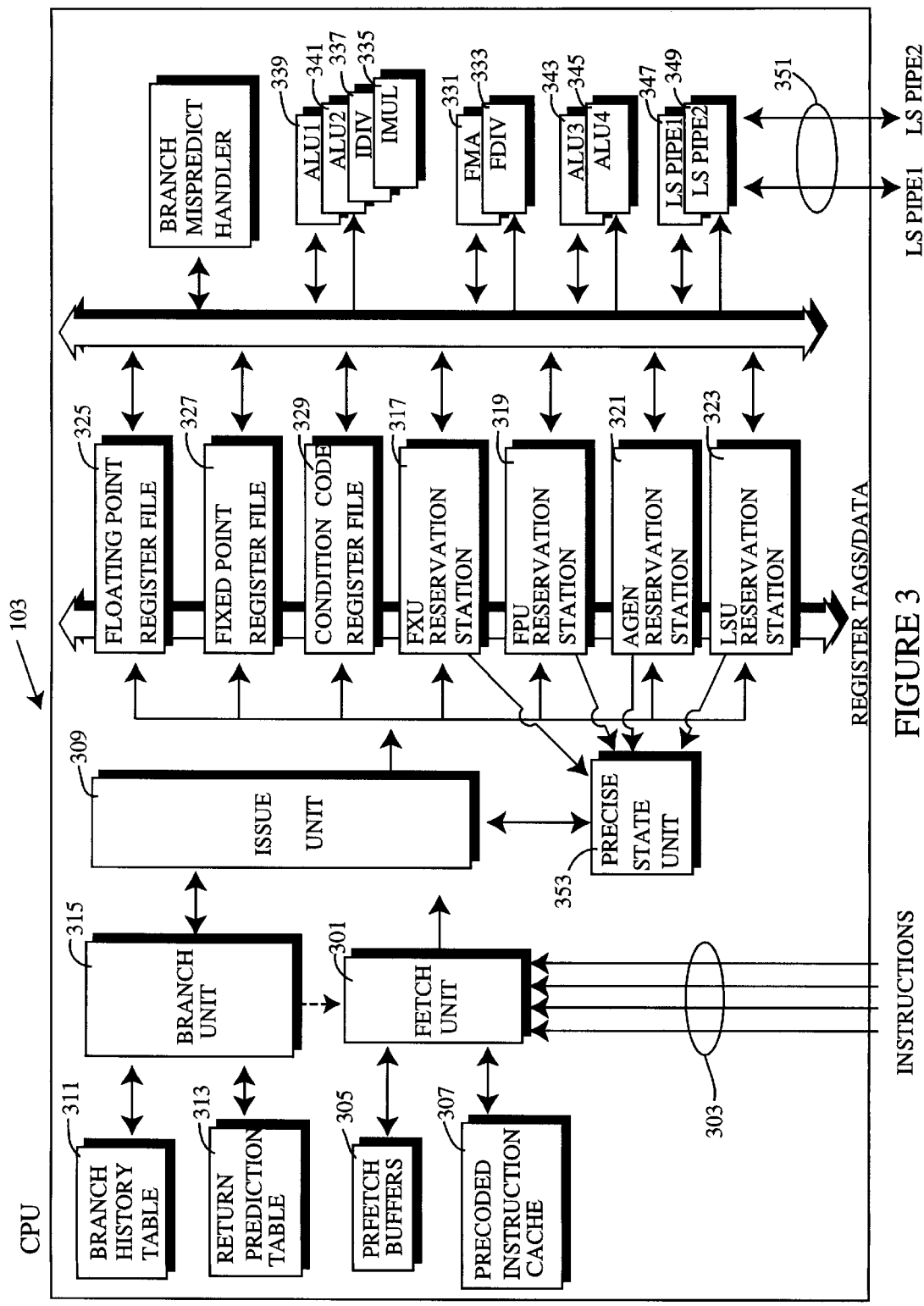
FIG. 3 is a block diagram of the central processor unit (CPU) of FIG. 1.

Referring to FIG. 3, a block diagram of CPU 103 is shown which includes fetch unit 301. During each cycle, four instructions may be fetched by fetch unit 301 over instruction bus 303 from primary caches 109, 111 (FIG. 1), two prefetch buffers 305 which may hold two sixteen instruction lines, or secondary, precoded instruction cache 307, and forwarded to issue unit 309. Fetch unit 301 provides fetched instructions to the Issue unit which is responsible for dispatching them to the Data Flow units. To improve cycle time, instructions in the primary cache have already been partially decoded or recoded. Dynamic branch prediction is provided by 1024-entry branch history table 311 contains 2-bit saturating counters which are used to predict the direction of branches. In order to accelerate subroutine returns that contain indirect branch targets, return prediction table 313 is used to predict the return address for a subset of Jump and Link instructions. Information from tables 311, 313 is provided to branch unit 315 which in turn provides branch and return address prediction information to issue unit 309. Available machine resources and issue constraints are ultimately determined by issue unit 309. Instructions are issued by issue unit 309 in the order fetched by fetch unit 301 provided machine sources are available. Certain issue constraints can reduce the issue rate of instructions/cycle. Issue unit 309 resolves static restrictions and any dynamic constraints for instructions. Instructions are then decoded and dispatched to the reservation stations 317, 319, 321, 323. During the issue stage, four instructions may be speculatively dispatched from issue unit 309 to four reservation stations: fixed-point unit (FXU), floating-point unit (FPU), address generator unit (AGEN), and load-store unit (LSU) reservation stations 317, 319, 321, 323. Generally, any combination of four fixed-point, two floating-point, two load-store, or one branch instruction may be issued in a given clock cycle. Register files 325, 327, 329 are accessed in the issue cycle and may be renamed during the issue cycle to maintain maximum issue bandwidth. The integer register file supports four SPARC register windows. Floating-point, fixed-point, and condition code registers 325, 327, 329 may be renamed in order to remove data hazards. By renaming trap levels, traps detected during the issue stage can be entered speculatively. Each dispatched instruction is assigned a unique six-bit tag, enabling the tagging of as many as sixty-four outstanding instructions. Some instructions, such as branches, may be checkpointed by taking a "snapshot" of the architectural state. The state of processor 101 can later be restored to a selected checkpoint if a speculative instruction sequence is found to be issued or executed incorrectly due to branch mispredict or an exception condition. Processor 101 permits as many as sixteen instructions to be checkpointed which allows sixteen levels of predicted branch instructions.

During the dispatch stage, an instruction is placed in one of four types of reservation stations—Fixed Point, Floating Point, Address Generation, Load/Store. Fixed point instructions can also be sent to the Address generation reservation station. Once dispatched, an instruction awaits selection for execution in one of four reservation stations. Selection is based solely on dataflow principles of operand availability. An instruction can execute once the required operands are available, and as a result, instructions may execute out of order and are self-scheduling. A total of seven instructions can be selected for execution each cycle; the first fixed point, address generation, and load-store reservation stations are each able to initiate two instructions for execution, while the floating point reservation station is able to initiate one instruction. The floating-point execution units comprise a four-cycle pipelined multiply-add (FMA) unit 331 and sixty nano-second, self-timed floating point divide (FDIV) unit 333. The integer execution units include sixty-four bit multiply (IMUL) unit 335, sixty-four bit divide (IDIV) unit 337, and four Arithmetic Logic Units (ALU1, ALU3, ALU3, ALU4) 339, 341, 343, 345. Not including effects due to pipelining, a peak of ten instructions may be executed in parallel. The Load-Store Unit (LSU) includes two parallel, load-store pipeline (LS PIPE1, LS PIPE2) units 347, 349 which may send speculative loads to the cache 105, 109 through load-store bus 351 with loads permitted to bypass stores or earlier loads. The LSU is able to perform two independent sixty-four bit loads or stores during each cycle provided they are to different cache chips. The cache is non-blocking i.e. it can handle accesses to other addresses after a miss.

Integer multiply and divide units (MULDIV) 335, 337 perform all the integer multiply (except integer multiply step instruction) and divide operations. MULDIV 335, 337 are not pipelined internally, and can only execute one multiply or divide instruction at a time. MULDIV 335, 337 comprise a sixty-four-bit multiplier and a sixty-four-bit divider with a common sixty-four-bit carry propagate adder.

Multiply unit 335 executes all signed and unsigned thirty-two-bit and sixty-four-bit multiply instructions. Thirty-two-bit signed and unsigned multiplications are completed in three cycles and the sixty-four-bit signed and unsigned multiplications are completed in 5 cycles. Multiply unit 335 contains a multiplier tree which is capable of computing a sixty-four-by-sixteen bit multiplication in a single clock cycle in carry-save form. For thirty-two-bit multiplies, multiply unit 335 loops two cycles in the multiply-tree to reduce two partial results in carry-save form, and takes another cycle for the sixty-four-bit carry propagate adder to generate the final result.

Divide unit 337 implements a radix four SRT algorithm and may complete sixty-four-bit divides in 1 to 39 cycles, with an average latency of 17 cycles.

Floating point multiply-add unit (FMA) 331 is responsible for executing all single and double precision floating point operations (except for floating point divide), floating point move operations, and specified multiply/add/subtract operations. FMA 331 shares result bus 809 with floating point divide (FDIV) unit 333.

FMA 331 may implement a fused multiply-add instruction (e.g. A* B+C). A 'fused' multiply-add operation means that only one rounding error is incurred in the combined operation. All other floating arithmetic is implemented as a special case of the fused multiply-add. For example, subtraction is implemented as a fused multiply-add with the 'B' operand forced to one, and with the sign of the 'C' operand set to its complement. FMA 331 is a four-stage fully pipelined unit and can accept one floating point instruction every cycle.

The first stage in the FMA pipeline formats the input operands, generates the first half of the partial multiplier result in carry-save form, calculates an alignment shift count for the add operand, and completes the first half of the add operand alignment to the multiplier-product. The second stage in the FMA pipeline reduces the multiplier result to two partial products in carry-save form, adds the 'C' operand to the partial product and completes the first half of the leading zero calculation. The third stage in the FMA pipeline finishes the leading zero calculation, sums the two partial products, and normalizes the result. The fourth stage in the FMA pipeline determines exceptions and special cases, rounds the result to the required precision and formats the output.

Floating point divide unit (FDIV) 333 executes all floating point divide instructions. FDIV 333 is a self-timed, functional block which makes use of fast precharged circuit techniques for computing quotient digits directly using a modified radix-two SRT algorithm. FDIV 333 executes one floating divide instruction at a time. FDIV 333 may be viewed as a combinational array implementing fifty-five stages and returning a result after about six clock cycles. The precharged blocks are looped into a ring and are controlled by self-timing. The self-timed ring computes the quotient mantissa in five stages. Five stages may be selected to evaluation limit (and not control limit) the ring. The ring is developed without internal latches in the stages. Each of the five stages is used to calculate the next remainder and quotient bit using the current remainder and quotient digit. By replicating some short carry propagate adders, the execution time is reduced because execution of neighboring stages can be overlapped. Each stage comprises precharged logic blocks that are controlled by completion detectors monitoring the output of neighboring stages. While data flows around the stages in the self-timed ring, the quotient bits computed in each stage are accumulated in a shift register. The final rounding is done in one additional clock cycle while the entire ring precharges again for the next operation.

Load store units (LSUs) 347, 349 interface with the two non-blocking data cache chips 105, 107. Cache bus 351 is interleaved between the cache chips on sixty-four boundaries. LSUs 347, 349 may support both little-endian and big-endian formats. LSUs 347, 349 support both relaxed memory model (RMO) and total store ordering (TSO) modes that are defined in the SPARC-V9 Architecture Manual from Sun Microsystems. LSUs 347, 349 are responsible for scheduling for both fixed and floating point load/store instructions and may make up to two requests each cycle to the cache 105, 107. Instruction ordering is utilized to maintain precise state and is managed by a set of protocol signals between CPU 103 and the cache chips 105, 107. LSUs 347, 349 contain a twelve-entry reservation station. In the RMO mode, load instructions are allowed to speculatively bypass store instructions. A three stage pipeline is used to support split transactions between LSUs 347, 349 and data caches 105, 107. During the first stage, an instruction address, opcode, serial number, and control bits used for speculative execution are sent by LSU 347 (349) to data cach 105 (107). During the second stage, data from a store instruction is sent from LSU 347 (349) to Data Cach 105 (107) and the Ser. No. and valid bit of the instruction that will complete in the next cycle is sent from data cach 105 (107) to LSU 347 (349). During the third stage, data cach 105 (107) returns the status and load data. On a cache miss, data cache 105 (107) returns the data during an unused pipeline slot or will assert a signal which opens up a pipeline slot for the data.

As instructions complete execution, results are broadcast to reservation stations and status information is provided to the precise state unit (PSU) 353. As many as nine instructions can complete in a cycle. PSU 353 (and reservation stations 317, 319, 321, 323) uses the tag number of each issued instruction to keep track of instructions. PSU 353 also maintains check-points made for instructions that affect architectural state and CTI's. PSU 353 tracks error and completion status, and commits and retires instructions in order. Eight instructions may be committed and four instructions retired each cycle. PSU 353 also sequences external interrupts and instruction exceptions.

Figure 4:
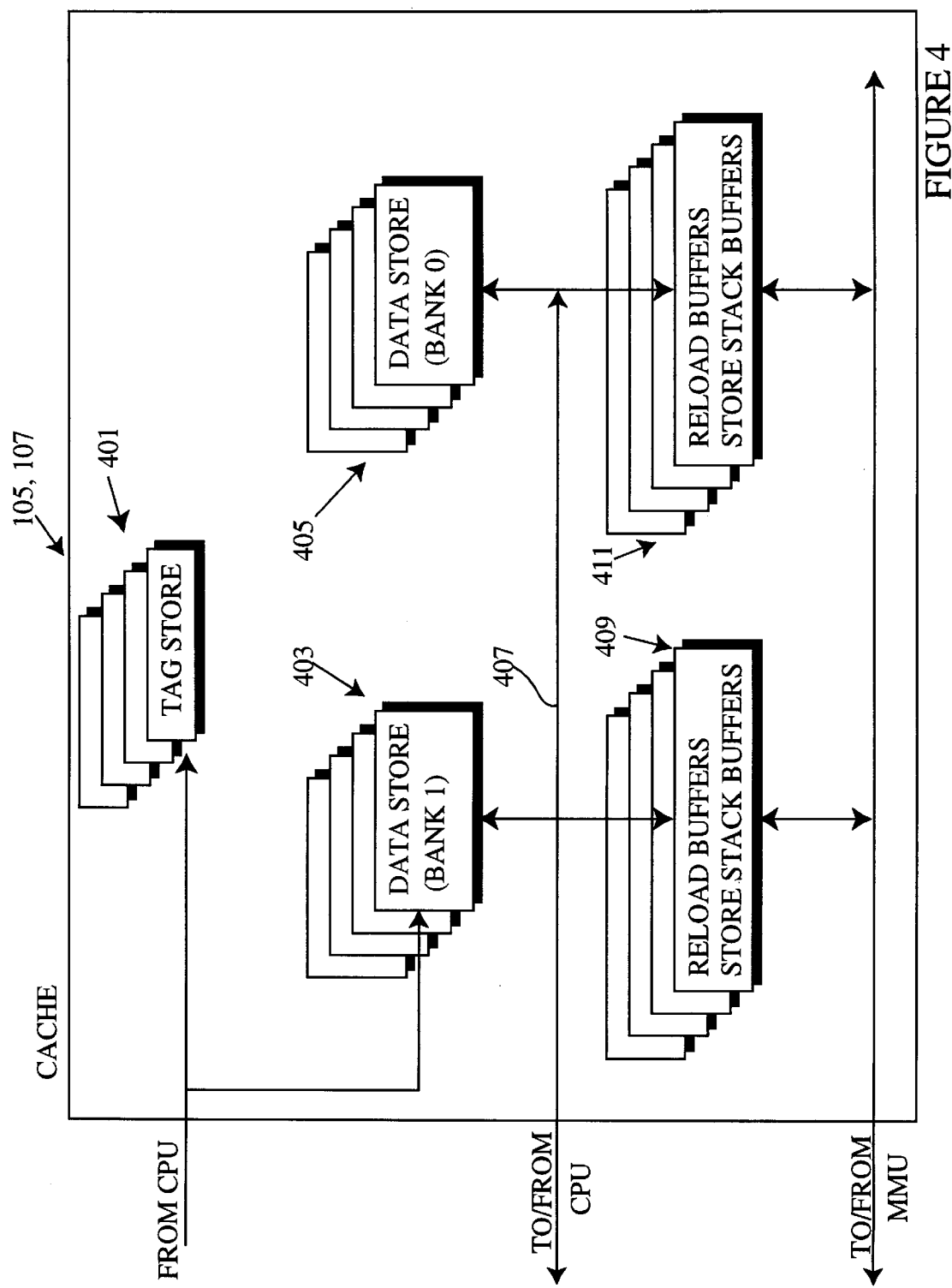
FIG. 4 is a block diagram of the cache of FIG. 1.

Referring to FIG. 4, a block diagram of cache 105, 107 is shown. Cache 105, 107 comprises two cache chips and tag storage unit 401. Each cache chip contains 64 Kbytes of data storage, organized as two data banks containing four sets of addressable registers. Tag storage unit 401 is accessed by CPU 103 which virtually indexes and tags data stored in and transferred from cache 105, 107. For both data (and instruction) caches 105, 107 (109, 111), a 128-byte cache line is divided between two cache chips, with each cache chip receiving 64 bytes of data or instructions. Each cache chip can service two independent requests from CPU 103. The CPU-cache interface is non-blocking so that CPU 103 can access cache 105, 107 while a cache line is being refilled or flushed. Latency from address generation to data utilization encompasses three cycles. Banks 403, 405 and MMU 129 are connected through reload and store stack buffers 409, 411. Two outstanding misses can be serviced by each cache chip that blocks on the third miss. Multiple misses to the same cache lines are merged and counted as a single miss.

Figure 5:
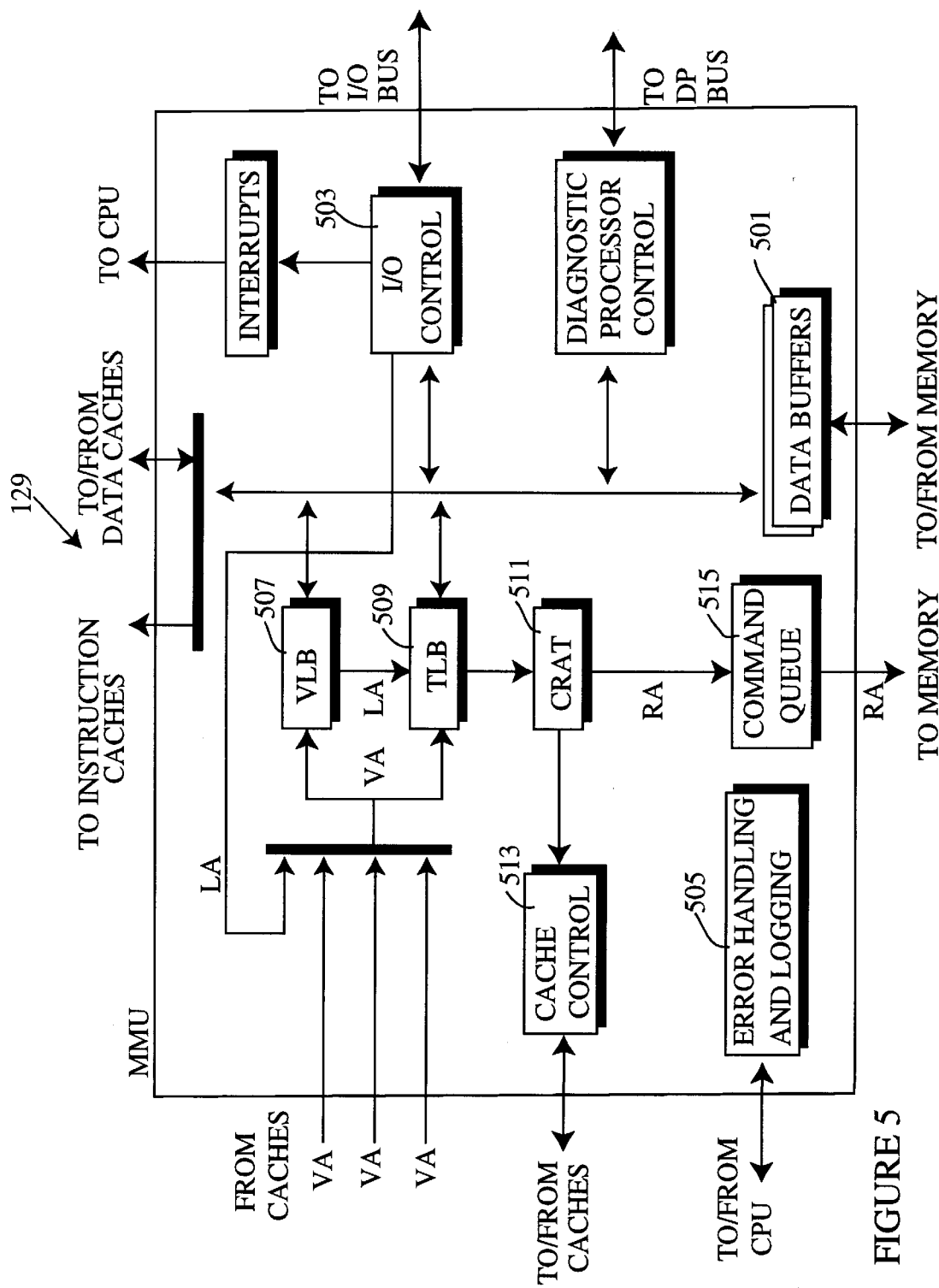
FIG. 5 is a block diagram of the memory management unit (MMU) of FIG. 1.

Referring to FIG. 5, a block diagram of MMU 129 is shown. MMU 129 is responsible for memory management and data coherence, interfacing to memory and I/O systems through data buffer 501 and input/output (I/O) control unit 503, and error handling through error handling and logging unit 505. MMU 129 has three levels of address spaces: a virtual address (VA) space for the processor, a logical address (LA) space for I/O devices and the Diagnostic Processor, and a physical address space for memory. These hierarchical address spaces provide a mechanism for managing the sixty-four bit address space. Several lookaside buffers reside within MMU 129 to service these multiple-level address translations. View lookaside buffer (VLB) 507 is a CAM-based, fully associative, 128-entry table which is responsible for virtual address to logic address translation. Translation lookaside buffer (TLB) 509 is a four-way set-associative 1024-entry table that is used for logical address to real address (RA) translations. Cache real address table (CRAT) 511 is a four-way set-associative table that stores real address tags. CRAT 511 is responsible for data coherence between Caches and memories through cache control and command queue units 513, 515.

Figure 6:
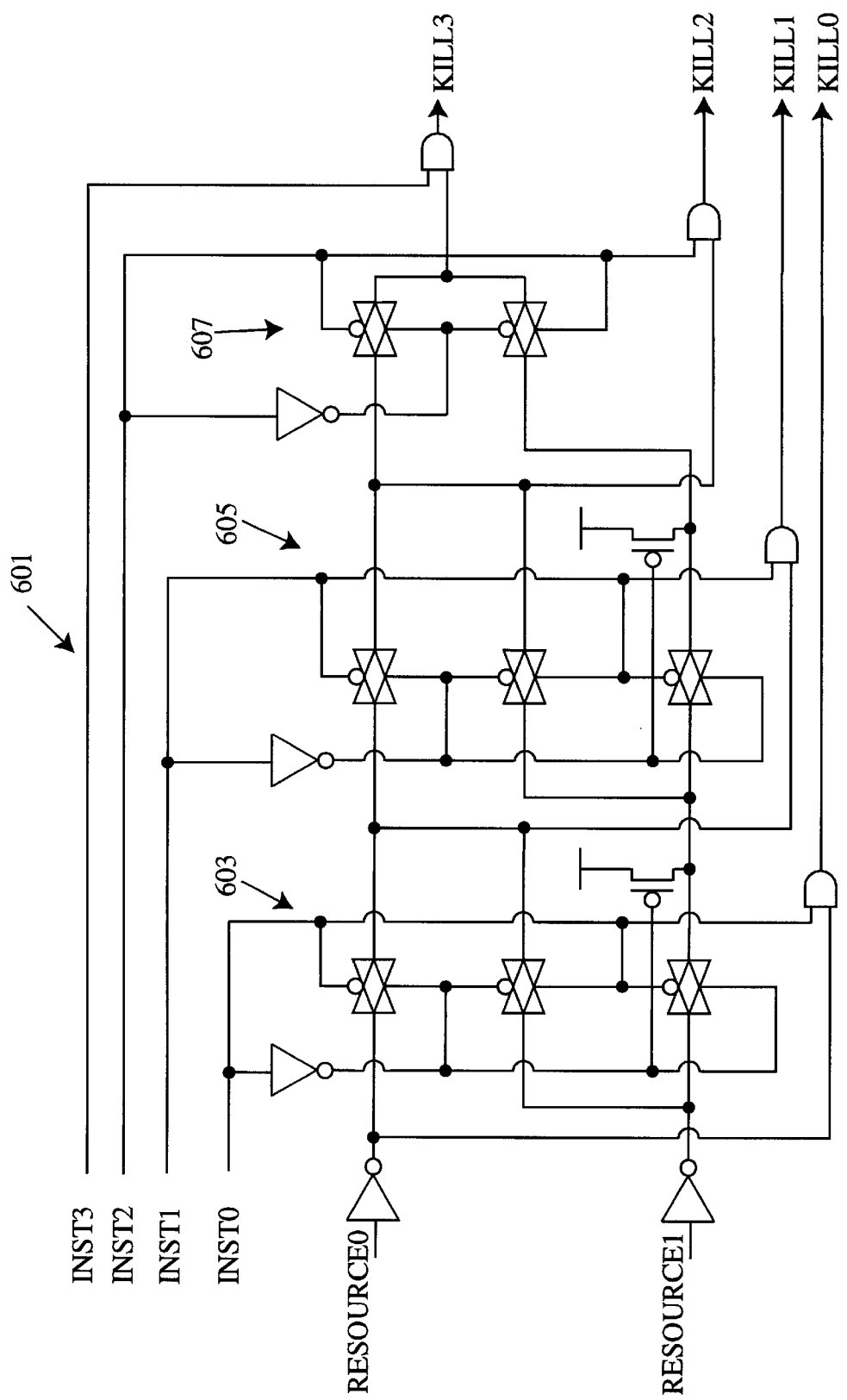
FIG. 6 is a block diagram of a resource stall unit used by the issue unit of FIG. 3.

Referring to FIG. 6, resource stall block circuit 601 may be used to reduce the delay of critical timing paths of issued instructions. Resource stall block 601 connects Issue Unit 309 to reservation stations 317, 319, 321, 323 and provides a path through which instructions (INST0, INST1, INST2, INST3) may be passed. Based on resource availability and attributes decoded from the instructions, three-levels of transmission gates 603, 605, 607 generate a stall vector and prevent untimely instruction issuance. Delay in the circuit scales linearly with the number of instructions that are issued.

Figure 7:
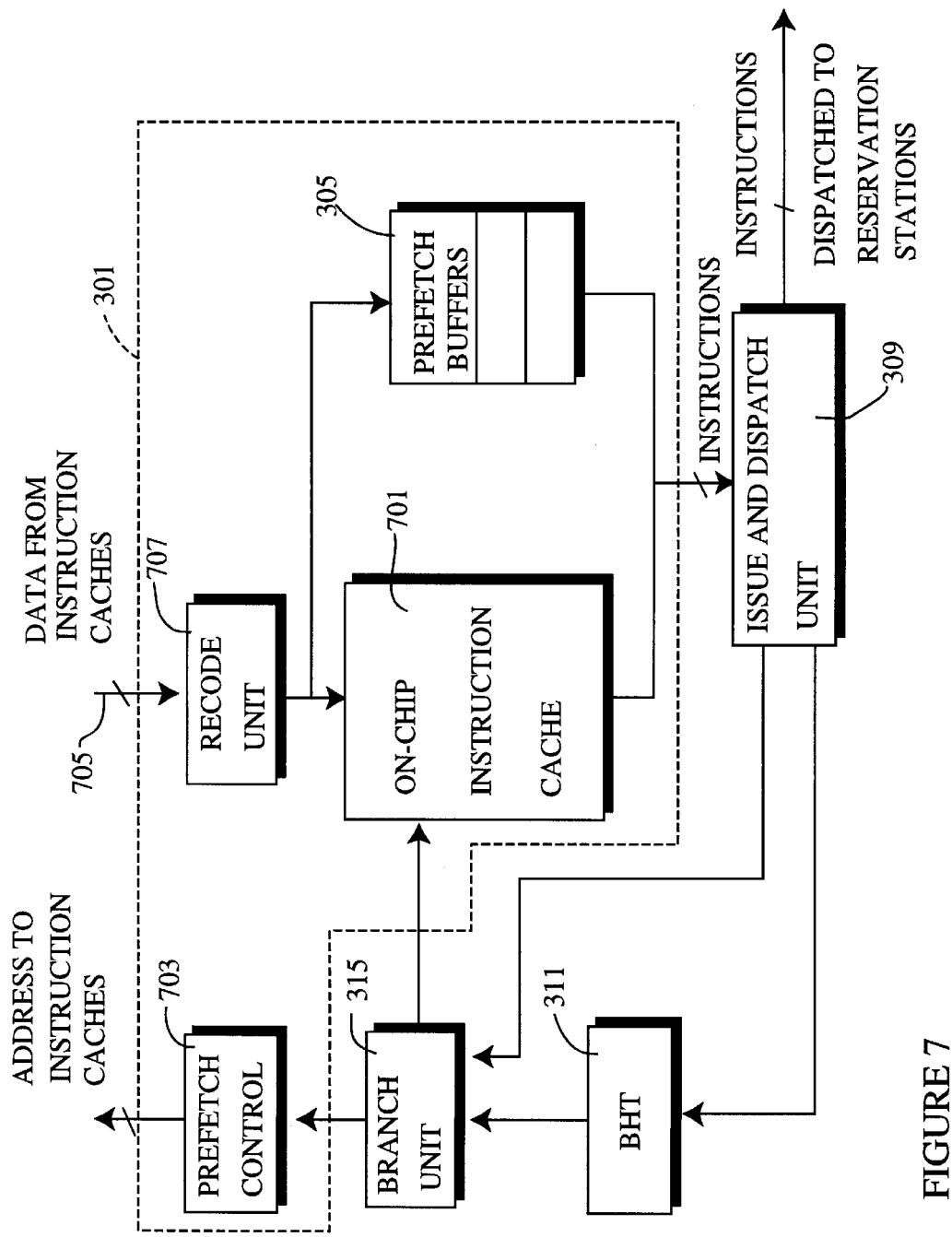
FIG. 7 is a block diagram of the fetch, branch and issue units of FIG. 3.

Referring to FIG. 7, a block diagram of the fetch, branch and issue units is shown. Fetch unit 301 interfaces between the off-chip instruction caches 109, 111 and branch and issue units 315, 309. Fetch unit 301 prefetches up to two 64-byte lines ahead of the current program counter, recodes and stores instructions in a 4-Kilobyte direct-mapped instruction cache 701, and forwards four sets of instructions and tags each cycle to issue unit 309. Branch history table 311 maps to all 1024 locations of instruction cache 701, using a dynamic two-bit prediction algorithm for predicted branches.

A fetch from on-chip cache 701 always returns four instructions to issue unit 309 (an on-chip cache hit) unless the access is to the end of the line, for example, two cache lines cannot be accessed concurrently (an on-chip cache miss). Storing (or writing) data may occur in parallel with reading from cache 701 and therefore does not block read accesses or generate a miss. In the case of a miss, fetch unit 301 activates prefetch control logic interface 703 based upon the missed address. Prefetch interface 703 implements a split transaction protocol and supports a connection to a single off-chip cache with quad-word support, or two caches, such as caches 109, 111 supplying two instruction words and separate status information. Requests are uniquely identified by partial address.

External caches, such as caches 109, 111, return the identifiers one cycle before the data, and these are used to set up the writes to prefetch cache lines 705. Off-chip fetched instructions pass through recode unit 707 that recodes control transfer and illegal instructions. Recode unit 707 calculates partial target addresses for branches and calls, prepends a control bit and stores a calculated target in an original instruction. This technique results in only one extra bit for each instruction, and reduces the branch target calculation to a simple increment or decrement of the upper bits of the program counter (not shown).

After recode, instructions are latched and written into cache 701 during the next clock cycle. Instructions may also be forwarded directly to other components of the system such as prefetch buffer 305.

Parity error detection is implemented and resulting errors are passed along with individual instructions. Thus, a parity error on the instruction interface is incurred only if an attempt is made to issue the erroneous data.

Branch history table 311 provides eight bits of branch history information, two bits per instruction, and forwards them to branch and issue units 315, 309. Branch history table 311 handles the update to one two-bit location each cycle a branch is issued. Along with updates to branch history table 311, return prediction table 313 stores the branch prediction bits and address of the issued branch. On a backup due to a mispredicted branch, return prediction table 313 provides an update mechanism to modify and update the original two-bit value in branch history table 311.

Branch unit 315 is responsible for the calculation of targets for all branches and a subset of jump and link (JMPLS's) instructions. Branch unit 315 maintains the Architecture Program Counter (APC) and the Fetch Program Counter (FPC). The APC stores the address of the instruction of the program being issued. The FPC stores the next sequential address for the next instruction to be fetched. On-chip instruction cache 701, prefetch buffers 305, branch history table 311 and external caches, such as caches 109, 111 are accessed using FPC.

In order to keep track of processing within a 4-issue speculative processor, such as processor 103, five counters are maintained internal to CPU 103: the APC, a next APC(NAPC), a Checkpoint PC(CPC), a Checkpoint next PC(CNPC) and an alternate next PC(ANPC). The APC and ANPC point to the addresses of the first and next instruction currently being issued by the issue unit 309. The CPC and CNPC, which are stored in a checkpoint RAM (not shown), are copies of the PC and NPC and are used to maintain precise state. The ANPC stores the address of a first instruction for an alternate path from a predicted branch and is used for recovery from mispredictions. The APC is updated based on the number of instructions issued every cycle. The APC is also updated based on Control Transfer Instructions (CTI's), mispredictions, tapes and exceptions.

Issue unit 309 tries to issue up to four instructions from a 4-entry instruction buffer (not shown) every cycle. Instructions are accessed from on-chip instruction cache 701 every cycle and decoded to determine the presence of CTI instructions. When no CTI's exist in the buffer or in the instructions accessed from cache 701, the FPC is updated to point to the end of the buffer. When a CTI exists in the issue window or in the instructions accessed from the cache, the prediction bits from branch history table 311 are used to determine the direction of the CTI. The FPC is then updated to the end of the buffer or to a target of the CTI. The actual implementation is complicated by the presence of delay slots and Annual bits associated with branches.

Return prediction table 313 supports fast prediction of selected classes of JMPL's that are used for Subroutine returns (JUMPR). Return prediction table 313 includes a set of four sixty-four-bit registers which shadow a set of four architectural registers. Each time a CALL or JMPL$_{13}$CALL instruction is issued, the return address saved in one of the four shadow registers. Return prediction table 313 is controlled by the current window pointer(CWP). When a JUMPR is encountered, the RPT is accessed based on the CWP and the saved address is used for predicting the return location.

During the issue cycle, source operands are read from a register file or data forward bus and sent to the execution unit along with associated physical register addresses. Fixed Point register and file unit (FXRF) 327 has ten read ports and four write ports. Within FXRF 327, register files store the renaming maps enabling fixed point registers to be renamed and read in the same cycle. Floating point register and file unit (FPRF) 325 is similar to FXRF but has six read ports and three write ports.

The combination of the reservation stations with execution control logic is referred to as a data flow unit (DFU), which is responsible for allocating entries in reservation stations 317, 319, 321, 323 and for scheduling instructions to the functional units for execution. Each reservation station entry includes opcode information, source/destination register numbers, source data, Serial number and Checkpoint number fields. The DFU monitors the data forward buses for tag and result data. In the case of a tag match, the required data is stored in the appropriate reservation station and an associated dependency bit in the reservation station is updated. Once all the dependency bits are set, the instruction along with its source data is sent to the appropriate functional unit. Generally, if more than two instructions in the reservation station are ready for execution, the two oldest ones will be selected. If there are no instructions in the reservation station and if the issued instructions have all the required data, then they may be dispatched to the functional units directly.

The DFU monitors occurrences when issue unit 309 issues an instruction beyond unresolved branches and may kill the instruction in a given reservation station that sits in the predicted path of branch instructions. The reservation stations 317, 319, 321, 323 keep track of checkpoint number for every entry. In the case of mispredicted branches, PSU 353 sends the checkpoint number that should be killed to the DFU. The DFU then kills all the instructions that match the checkpoint number.

Figure 8:
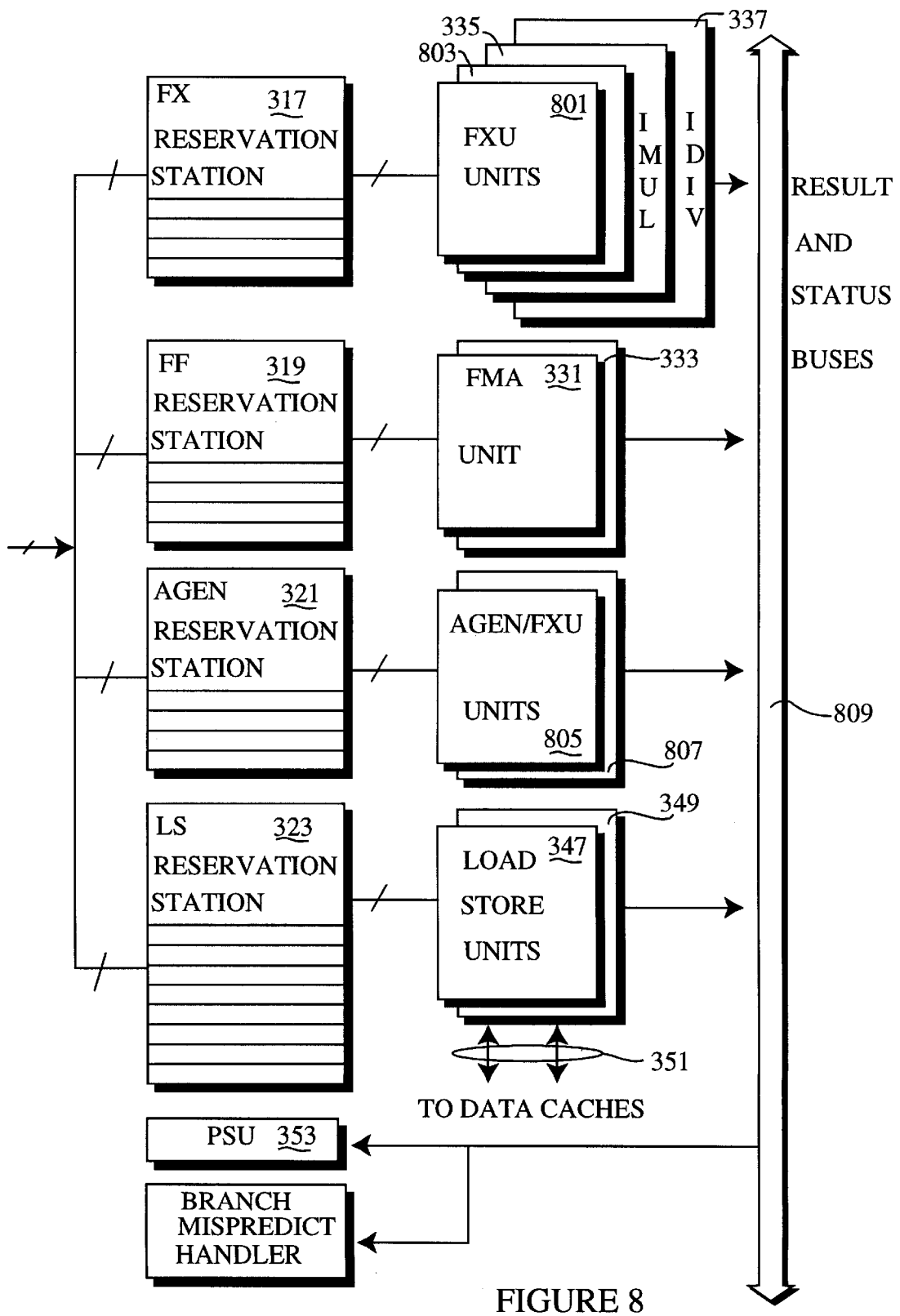
FIG. 8 is a block diagram of the data flow and functional units of FIG. 3.

Referring to FIG. 8, a block diagram is shown of reservation stations 317, 319, 321, 323 and functional units 331 –337, 801–807, 347, 349 of CPU 103. FX reservation station (DFMFXU) schedules fixed point instructions for two integer (FXU) units 801, 803. DXMFXU 317 contains an eight-entry reservation station. Integer multiply and divide units 335, 337 are also connected to the DFMFXU. The basic algorithm to select instructions is "oldest-ready".

FP reservation station (DFMFPU) 319 schedules one instruction per cycle for the floating point unit which includes the floating point multiply-add (FMA) and floating point divide (FDIV) units 331, 333. FMA unit 331 is a four-cycle fully pipe-lined compliant 'fused' floating point multiply and add unit that complies with Institute of Electrical and Electronic Engineers (IEEE) 754. FDIV unit 333 is a self-timed, IEEE 754 compliant floating point divide unit.

The AGEN reservation station (DFMAGEN) 321 schedules fixed point and load/store instruction address generation to two integer (AGEN/FXU) units 805, 807. DFMAGEN is similar to DFMFXU except that address generation of younger loads is stalled if there is an active older store in the reservation station.

LS reservation station (DFMLSU) 323 schedules memory operations including loads, stores and atomic instructions to the external data caches 105, 107 through load store (LSPIPE1, LSPIPE2) units 347, 349 and bus 351.

CPU 103 contains four dedicated functional units (FX1-4) 801, 803, 805, 807 for single-cycle, fixed point arithmetic calculations and logical and shift operations. To minimize the number of buses, FX1 801 shares the operand buses and result bus 809 with integer multiply and divide units 335, 337. All targets for JMPL instructions are calculated in FX2 803. The result from FX2 803 is also shared with return data from the privileged and state registers of processor 101. FX3 805 and FX4 807 are used primarily for address calculations for load store instructions but can also be used for fixed-point calculations. FX3 and FX4 do not support shift operations. Adders used in the FX units 801, 803, 805, 807 may be sixty-four-bit fast carry propagate adders. Fixed point units 801, 803, 805, 807 contain three separate operation units. An add-subtract unit executes all the integer addition and subtraction instructions plus multiply step instructions. A logical unit performs all the logical, move, and some processor register read operations. A shift unit is responsible for executing all the shift operations. Integer multiply and divide units (MULDIV) 335, 337 share the operand busses and result bus 809 with FX1 801 and uses FX1 for one cycle at the start and end of a multiply or divide instruction.

Figure 9:
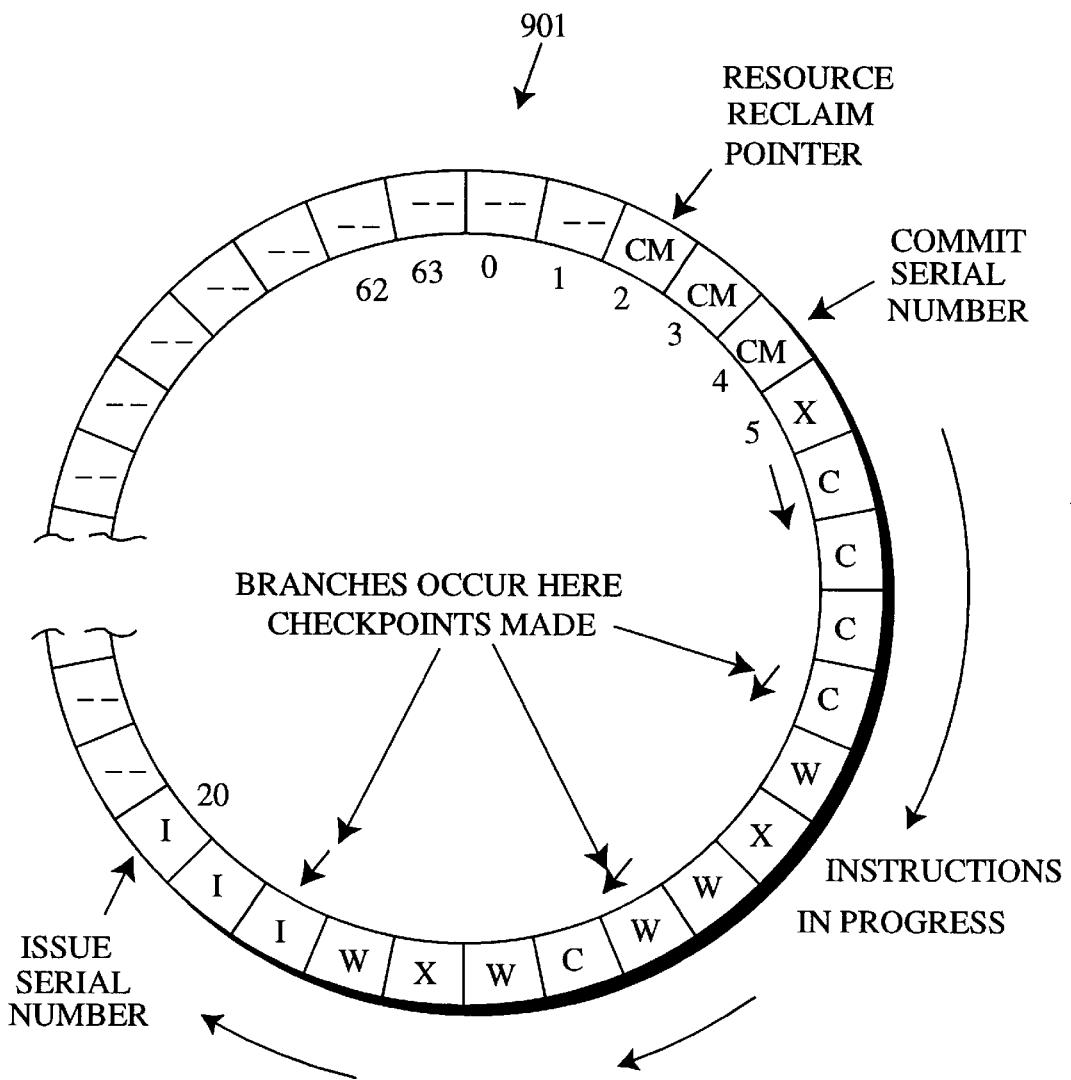
FIG. 9 illustrates a symbolic A-ring of active instructions utilized by the CPU of FIG. 3 to maintain the correct architectural state.

Referring to FIG. 9, a symbolic ring of active instructions (A-ring) 901 processing within processor 101 is shown. The A-ring illustrates a relation between the instructions that is maintained by processor 101 during processing. The size of the A-ring is sixty-four instructions corresponding to a maximum of sixty-four instructions that can be active in processor 101 at any one time. As mentioned earlier, every issued instruction is assigned a unique serial number. When the instruction is issued, an associated entry in the A-Ring is set. When an instruction executes, an associated bit is cleared if the instruction completes without error. Four pointers are used to keep track of the state of an instruction. Issue serial number pointer (ISN) points to the serial number of the last issued instruction. Committed Ser. No. pointer (CSN) points to the last committed instruction. Resource reclaim pointer (RRP) points to the last retired instruction. Active instructions are categorized in five states—Issued (I), Waiting (W), Executing (E), Completed (C), Committed (CM). The non-memory committed Ser. No. pointer (NMCSN) is used to aggressively schedule load/store instructions.

To maintain precise state, processor 101 uses checkpointing. Checkpointing makes a copy of the machine state which can be restored in the case of mispredicted branches or exceptions. Processor 101 supports sixteen checkpoints which allows speculative issues across sixteen branches. Checkpoints are made for CTI instructions or when a non-renamed architectural state is modified. Checkpoints are also used to identify the instruction to be killed in the execution unit once branch mispredictions or exceptions have been detected by PSU 353.

The CPU inter-chip pins and on-chip Instruction cache 701 are protected by parity which provides a high degree of reliability for the system. In the case of a parity error, information is sent to PSU 353 to stop the issue of new instructions and restore the processor state in order to point to the associated faulting instruction. In case the error cannot be associated with an instruction, the machine waits for an instruction to commit and then gives cache 701 three cycles to complete any incomplete transactions. CPU 103 then enters the Rest, Error Debug mode (RED) as defined by SPARC-V9 software and attempts to recover machine state.

Instruction dispatched throughout CPU 103 are formatted as shown below:

TABLE 1

Instruction Format

| 35 | 34 | 33 | 32 | 31 | 0 |
|----|----|----|----|----|---|
| P  | R1 | R2 | CNTL | OPCODE | |

The operation code filed (OPCODE) comprises bits [31:0] which are the same as the Sparc-V9 opcode, except when the instruction is a conditional branch (V9 or V8 Bcc, FBcc, or Brval) or when the instruction is a CALL. The format for these instructions will be discussed shortly. The control field (CNTL) comprises bit [32], is used in conjunction with conditional branches and CALL. The recode fields (R1, R2) comprise bits [33:34] and have the following encoding:

TABLE 2

Recode Field Encoding

| [R1:R2] | Description |
|---------|-------------|
| 00 | illegal |
| 01 | legal |
| 10 | reserved for future use |
| 11 | reserved for future use |

Only IMATRIX is concerned with the two-bit recode field. The first recode value indicates an illegal instruction as specified in the V9 architecture. The second recode value 01 indicates a legal and valid instruction. The last two encoded values are reserved for future use. The upper bit is invisible to all units except IPCG, and is used for parity.

For CALL and conditional branch instructions, the branch displacements are recoded into a branch target segment and Cnt1 bit. There are four formats of branch displacements in V9: sixteen, nineteen, twenty-two and thirty bits. The sixteen-bit form is used for a branch on register value (Brv1). The nineteen-bit form is used for V9 versions of Bcc and FBcc (predicted forms). The twenty-two-bit form is used for a V8 versions of Bcc and FBcc. The thirty-bit form is used for a CALL. All displacements are signed (two's complement). The displacement should be left shifted by two bits and then sign extended to sixty-four bits before being added to the PC of the branch instruction.

Recoding occurs by pre-adding the PC to the displacement and then recoding the carryout of the highest non-sign bit. The 'non-sign' bit is defined as the bit just below the sign bit of the displacement. For example, for a twenty-two bit displacement, bits [20:0] of the V9 instructions are added to bits [22:2] of the PC of the branch, forming Sum[20:0]. The carry out of this operation is labelled 'Carry'. Bit [21] of the V9 branch is the sign bit. For an instruction fetched from an off-chip cache, such as cache 109, 111, Sum[20:0] replaces the original opcode field [20:0], i.e. the actual low 21 bits of the target are stored in the on-chip (input/output or I/O) cache 701. Bit [21] and Cnt1 are compared according to the following table:

TABLE 3

Recode Format Carry Calculation

| Sign | Carry | Cntl | bit [21] | meaning |
|------|-------|------|----------|---------|
| 0 | 0 | 0 | 0 | +0 |
| 0 | 1 | 0 | 1 | +1 |
| 1 | 0 | 1 | 1 | −1 |
| 1 | 1 | 0 | 0 | +0 |

The column labeled 'meaning' indicates the effect on the top 41 bits of PC (PC[63:23]): +0 means add nothing "+1" means add one to PC[63:23], and "−1" means subtract one from PC[63:23]. A similar process occurs for other width displacements. Displacement recoding is used in order to speed up branch target computation in R__PC and R__IN. No other V9 instructions are recoded other than the branches. Finally, 4×35 bits of instruction information are now distributed during the FETCH cycle rather than 4×42 bits. The instruction recoding may be performed in approximately 3 nS which permits a 10 nS cycle time during the pipeline stage prior to FETCH.

Figure 10:
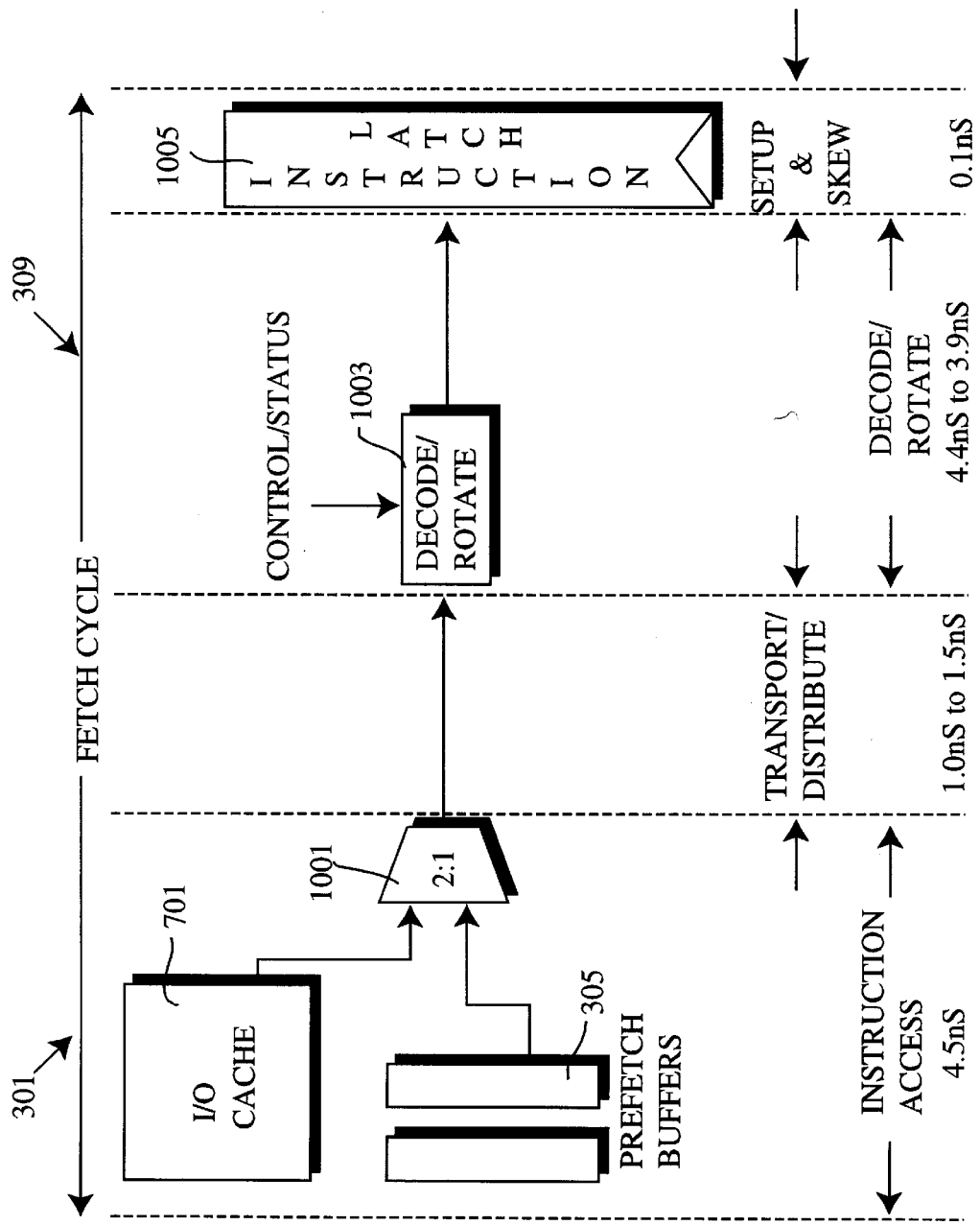
FIG. 10 is a block diagram of portions of a fetch and issue unit showing the processing of instructions during the fetch cycle.

Referring to FIG. 10, a block diagram of fetch and issue units 301, 309 of CPU 103 are shown in conjunction with a fetch cycle. During an instruction access portion of the fetch cycle, instructions are fetched from either I/O primary cache 701 or prefetch buffers 305 and directed to multiplex unit 1001. During a transport/distribute portion of the fetch cycle, fetched instructions are distributed to decode/dispatch block 1003 located within issue unit 309. During a decode/rotate portion of the fetch cycle, instructions are decoded and rotated within decode/rotate block 1003 as will be more fully discussed below. During a setup and skew portion of the fetch cycle, decoded and rotated instructions are latched by instruction latch block 1005 within issue unit 309.

In one embodiment of CPU 103, three decode dispatch blocks 1003 are implemented:

| IMX__DECODE | - servicing IMATRIX and the BRU |
|---|---|
| FX__DECODE__DISPATCH | |
| - fx__need__decode | :2x - servicing DFMFXU |
| - fx__op__decode | :2x - servicing DFMFXU |
| - fxrf__type__decode | :4x - servicing FXRF |
| - fxrf__decode | :4x - servicing FXRF |
| - fx__slot__select__decode | :1x - servicing FX__DECODE__DISPATCH |
| FP__DECODE__DISPATCH | |
| - lsu__need__decode | :2x - servicing DFMLSU |
| - lsu__op__decode | :2x - servicing DFMLSU |
| - fxagen__need__decode | :2x - servicing DFMFXAGEN |
| - fxagen__op__decode | :2x - servicing DFMFXAGEN |
| - fp__need__decode | :2x - servicing DFMFPU |
| - fp__op__decode | :2x - servicing DFMFPU |
| - fprf__decode | :4x - servicing FPRF |
| - fp__slot__select__decode | :1x - servicing FP__DECODE__DISPATCH |

In another embodiment of CPU 103, four decode dispatch blocks 1003 are implemented:

$IMX_{13}$ DECODE—servicing IMATRIX and $R_{13}IN$ units $BRU_{13}$ DECODE—servicing the Branch Unit blocks in R__PC FP$_{13}$ DECODE_DISPATCH—servicing FPRF, LSAGEN, DFMFPU, DFMLSU FX$_{13}$ DECODE_DISPATCH—servicing FXRF and DFMFXU Transport and distribution times will vary based on the distance between the instruction latches and the intended destinations of instruction data. Setup time has been approximated as −0.2 nS with a clock skew of 0.3 nS. Each decode/rotate block 1003 should allocate no more than −4 nS for all instruction rotations and decodes within a given cycle in order to meet a 10 nS cycle time.

In one embodiment of CPU 103, the following signals may be logically distributed throughout the chip:

TABLE 4

Fetch Cycle Signals

| name | rough timing (ns) | function |
|---|---|---|
| INST00[35:0] INST01[35:0] INST10[35:0] INST11[35:0] | 4.5 nsec departing R_IN | These are four slightly recoded V9 instructions, (as previously described). The last two letters of the name indicate the value of PC[3:2] for the instruction. |
| ISELECT[3:0] | 7.5 nsec departing R_IN | A 4 bit vector, with one bit per INSTxx. Each bit indicates whether to use the corresponding INSTxx bus being sent or to reuse the previously sent value of the corresponding bus. |
| IROTATE[1:0] | 7.5 nsec departing R_IN | A 2bit number indicating the rotation required to correctly align the INSTxx buses into issue order |

Figure 11:
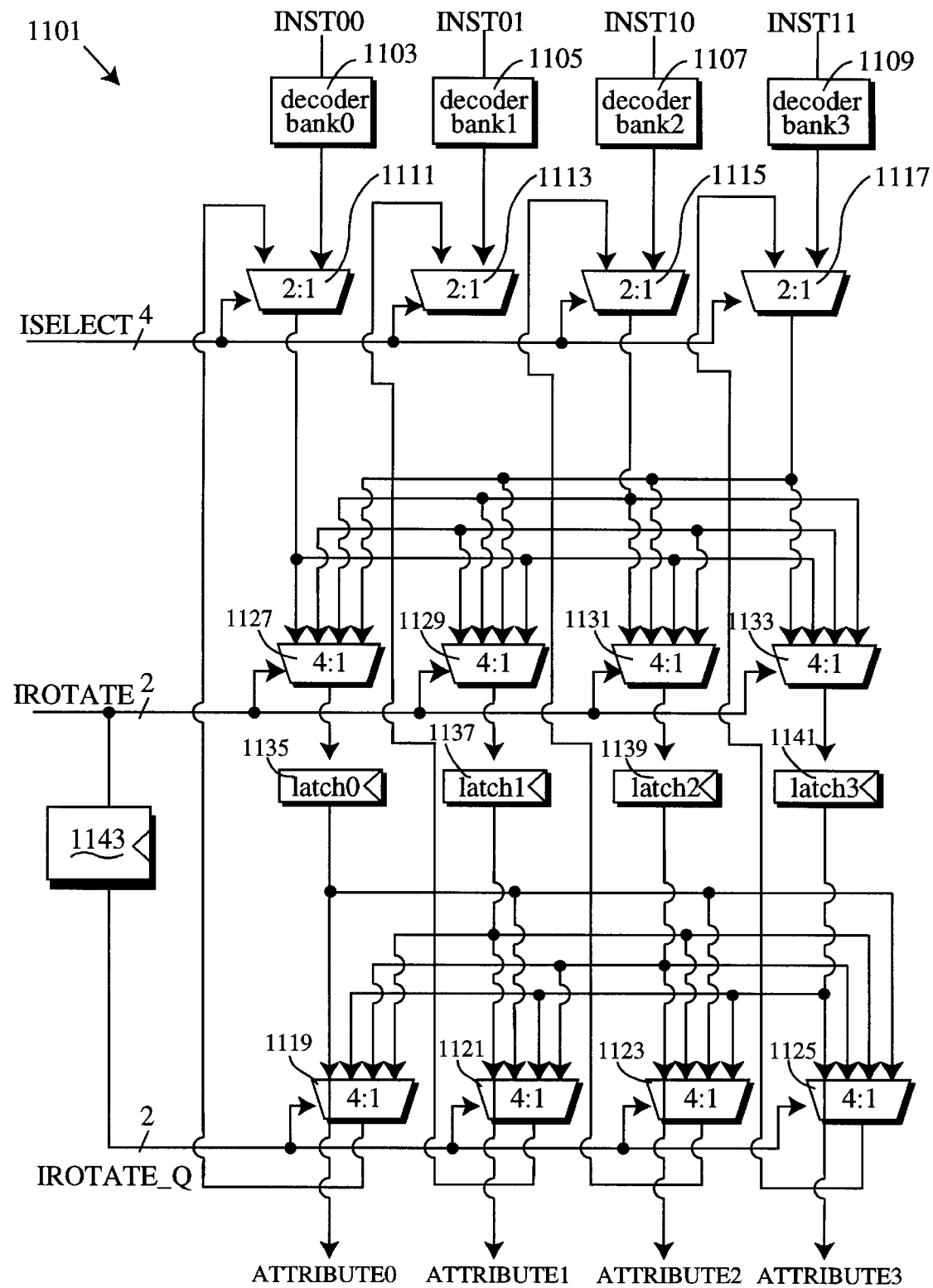
FIG. 11 is a block diagram of instruction rotate logic circuitry utilized by the decode/dispatch block of FIG. 10 to rotate fetched instructions into an issue order.

Referring to FIG. 11, a block diagram of instruction rotate logic circuitry 1101 within issue unit 309 is shown which is utilized to correctly issue instructions in the order required at respective destination dispatch/decode units. Four instruction (INSTxx) signals optionally are decoded by decoders 1103, 1105, 1107, 1109, simultaneously. After the decode operation, instructions are multiplexed in 2:1 multiplexers (muxes) 1111, 1113, 1115, 1117 (muxed) with earlier received instructions output from the bottom set of 4:1 muxes 1119, 1121, 1123, 1125. Each bit from the ISELECT [3:0] control signal is used to control one of the 2:1 muxes 1111, 1113, 1115, 1117, e.g. the least significant bit of the ISELECT signal control the muxing of INST00 based instructions. Each bit of ISELECT[nn] is defined such that a '1' signals the respective mux 1111–1117 to select INSTnn and a '0' means select the earlier INSTnn output from the respective bottom 4:1 mux 1119–1125. This muxing is done on signals in physical memory order. In one embodiment the 2:1 muxes 1111, 1113, 1115, 1117 operate as a pre-sorter and the 4:1 muxes 1119, 1121, 1123, 1125 and operate as a sorter.

In order to issue instructions in a PC specific issue order, the instructions are rotated out of a physical memory order. The instruction buses labelled INSTxx buses identify the physical memory order of each bus. The IROTATE vector signal indicates the number of addresses to rotate the INSTXX buses to develop the PC specific issue order. Table 5 lists the rotation of instructions with respect to the IROTATE signal into the issue order and respective instruction slots.

TABLE 5

IROTATE State Specification

| IROTATE | issue slot 0 | issue slot 1 | issue slot 2 | issue slot 3 |
|---|---|---|---|---|
| 00 | INST00 | INST01 | INST10 | INST11 |
| 01 | INST01 | INST10 | INST11 | INST01 |
| 10 | INST10 | INST11 | INST00 | INST01 |
| 11 | INST11 | INST00 | INST01 | INST10 |

The instruction rotation into issue order is performed 4:1 muxes 1127, 1129, 1131, 1133 according to the IROTATE control signal as shown in Table 5. The IROTATE signal is generated from the third and fourth bits of an architectural program counter. In one embodiment the 4:1 muxes 1127, 1129, 1131, 1133 operate as a sorter.

Once placed in issue order, the instructions are latched in latches (latchx or issue slot x) 1135, 1137, 1139, 1141. The output of these latches are directed during the issue cycle to logic circuitry in the respective reservation station 317–323. In addition, the output of the latches are directed to 4:1 muxes 1119–1125 to unrotate the instructions from issue order to physical memory order using a combination of the IROTATE signal from the previous clock cycle latched by inverse-rotate (IROTATE) latch 1143 and map logic circuitry. Each rotation state specified by a value of the IROTATE signal has a unique correspondence to another rotation state which unrotates the issue ordered instructions to physical memory ordered instructions. Map logic circuitry develops an unROTATE signal based upon the IROTATE signal of the prior fetch cycle as shown in Table 6 and directs the unROTATE signal to respective muxes 1119–1125 through paths connecting from the output of IROTATE latch 1143. The unROTATE signal instructs muxes 1119–1125 to rotate the issue ordered instructions so that the output instructions from muxes 1119–1125 are physical memory ordered. Refer to the table below:

TABLE 6 unRotation Map logic

| IROTATE | unROTATE |
|---|---|
| 00 | 00 |
| 01 | 11 |
| 10 | 10 |
| 11 | 01 |

In order to illustrate how instruction rotation is performed at instruction latches, consider the following code sequence:

| PC=0 | i0 |
|---|---|
| PC=1 | i1 |
| PC=2 | i2 |
| etc . . . | | with respect to Table 7.

TABLE 7

Instruction Sequence

| CLK | FPC | RAW INSTXX | unrotated ilatches | IXSELECT | 2:1 mux out | IROTATE | APC_D | issue valid | ilatch contents |
|---|---|---|---|---|---|---|---|---|---|
| 0 | 0 | i0, i1, i2, i3 | xx, xx, xx, xx | 1111 | i0, i1, i2, i3 | 00 | 0 | 0000 | xx, xx, xx, xx |
| 1 | 4 | i4, i5, i6, i7 | i0, i1, i2, i3 | 1100 | i4, i5, i2, i3 | 10 | 2 | 0011 | i0, i1, i2, i3 |
| 2 | 6 | i8, i9, i6, i7 | i4, i5, i2, i3 | 0010 | i4, i5, i6, i3 | 11 | 3 | 0001 | i2, i3, i4, i5 |
| 3 | 7 | i8, i9, i10, i7 | i4, i5, i6, i3 | 1111 | i8, i9, i10, i7 | 11 | 7 | 1111 | i3, i4, i5, i6 |
| 4 | 11 | i12, i13, i14, i11 | i8, i9, i10, i7 | 0000 | i8, i9, i10, i7 | 11 | 7 | 0000 | i7, i8, i9, i10 |
| 5 | 11 | i12, i13, i14, i11 | i8, i9, i10, i7 | 1101 | i12, i13, i10, i11 | 10 | 10 | 0111 | i7, i8, i9, i10 |
| 6 | 14 | xx, xx, i14, i15 | i12, i13, i10, i11 | 1011 | xx, i13, i14, i15 | 01 | 13 | 0111 | i10, i11, i12, i13 |
| 7 | 16 | j0, j1, j2, j3 | xx, i13, i14, i15 | 1110 | j0, j1, j2, i15 | 11 | 15 | 0011 | i13, i14, i15, xx |
| 8 | 19 | j4, j5, j6, j3 | j0, j1, j2, i15 | 1100 | j4, j1, j2, j3 | 01 | 17 | 0011 | i15, j0, j1, j2 |

During cycle 6, Table 7 shows that an end of a cache line was reached, resulting in an instruction issue bubble in cycle 7. jn indicates instruction words corresponding to the previous cache line.

As may be noted from Table 8, IROTATE is equal to APC[3:2].

TABLE 8

Truth Table for IROTATE[1:0]

| APC[3:2] | IROTATE[1:0] |
|---|---|
| 00 | 00 |
| 01 | 01 |
| 10 | 10 |
| 11 | 11 |

The value of the ISELECT[3:0] signal is dependent on values of ISSUE_VALID[3:0] and APC[3:2] control signals as shown in Table 9. A truth table is shown below:

TABLE 9

Truth Table for ISELECT[3:0]

| ISSUE_VALID [3:0] | APC_Q[3:2] | ISELECT[3:0] |
|---|---|---|
| 0000 | xx | 0000 |
| 0001 | 00 | 0001 |
| 0001 | 01 | 0010 |
| 0001 | 11 | 0000 |
| 0011 | 00 | 0011 |
| 0011 | 01 | 0110 |
| 0011 | 10 | 1100 |
| 0011 | 11 | 1001 |
| 0111 | 00 | 0111 |
| 0111 | 01 | 1110 |
| 0111 | 10 | 1101 |
| 0111 | 11 | 1011 |
| 1111 | xx | 1111 |

Additional signals which may affect the value of the ISELECT signal include cache-line discontinuation and starting from machine sync signals. The implementation of Table 9 may be optimized to handle cache-line discontinuities, and should be optimized when coming out of machine sync to prevent deadlock situations.

Rotate logic circuitry 1101 (SREGnx4Ds) may have an interface specification as listed in Table 10.

TABLE 10

SREGnx4D Interface Specification

| Signal | Description |
|---|---|
| DnA[n:0] | Data input for INST00 instruction, n is width of SREG |
| DnB[n:0] | Data input for INST01 instruction, n is width of SREG |
| DnC[n:0] | Data input for INST10 instruction, n is width of SREG |
| DnD[n:0] | Data input for INST11 instruction, n is width of SREG |
| ISELECT[3:0] | Instruction selection control |
| IROTATE[1:0] | Instruction rotation control |
| QnA[n:0] | Data output for INST00 instruction, n is width of SREG |
| QnB[n:0] | Data output for INST01 instruction, n is width of SREG |
| QnC[n:0] | Data output for INST10 instruction, n is width of SREG |
| QnD[n:0] | Data output for INST11 instruction, n is width of SREG |
| CLK CLK | System Clock |
| CLK SC | Scan Clock |
| IN SE | Scan Enable |
| IN SI | Scan Data Input |
| OUT SO | Scan Data Output |

Figure 12:
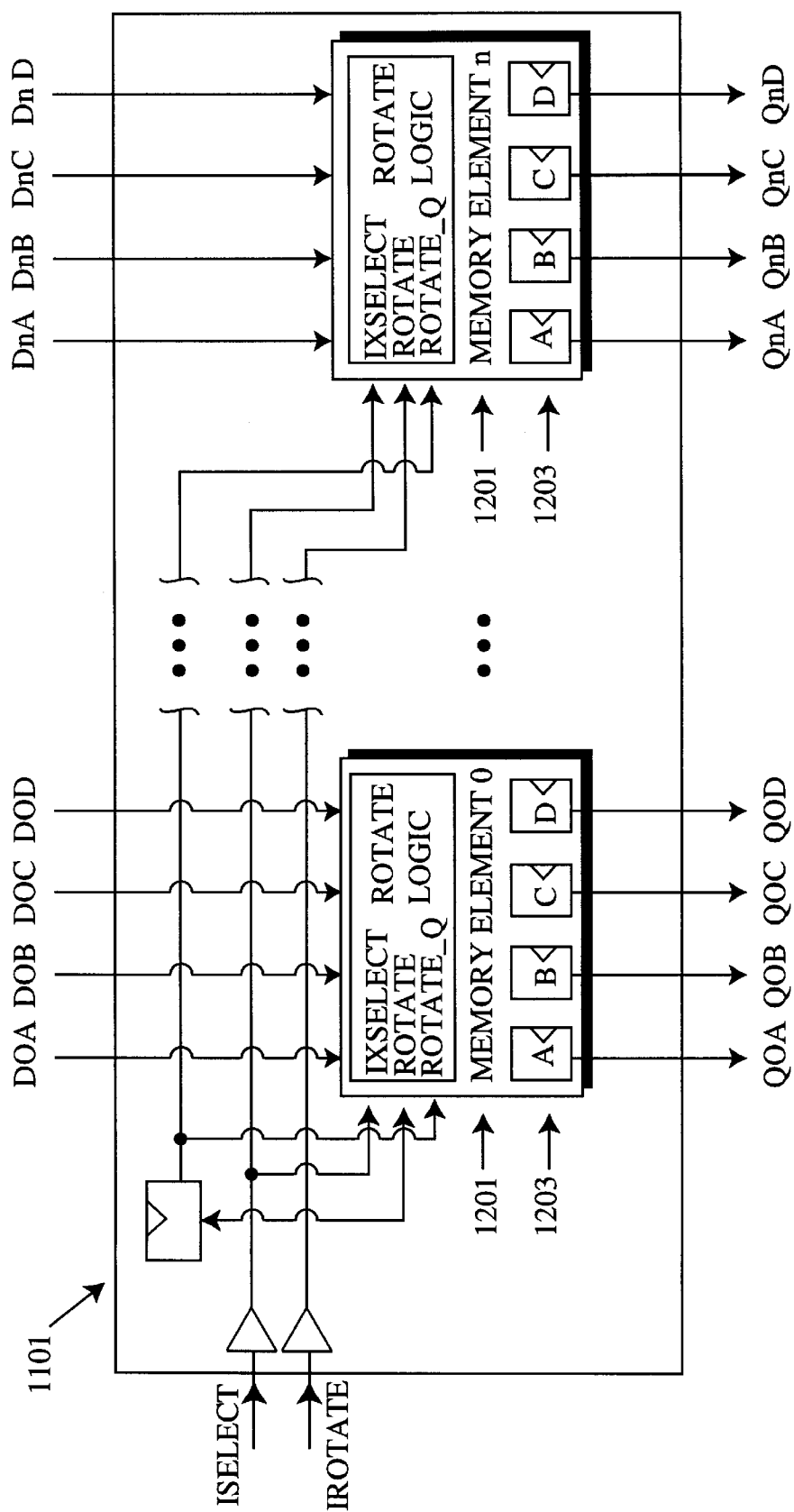
FIG. 12 is a block diagram of a series of 'n' memory elements with rotate logic shown within the decode/dispatch block of FIG. 10.

Referring to FIG. 12, each memory element 1201 in rotate circuitry 1101 comprises four separate flip-flops A, B, C, D with rotation logic. The output from flip-flops A, B, C, D 1203 corresponds to instruction slots in CPU 103. Since CPU 103 attempts to issue and dispatch up to four instructions per cycle, instruction latches need to be updated at the end of the FETCH cycle with dispatched instruction words. Rotation circuitry 1101 allows the instruction latch to move instruction bits from any of eight possible sources (four store bits and four new bits on data inputs) to any of the four instruction slots. As a result where 'n', each SREGnx4D comprises a minimum of nx4 flip-flops. Additional flip-flops are required to latch the control signals.

Figure 13:
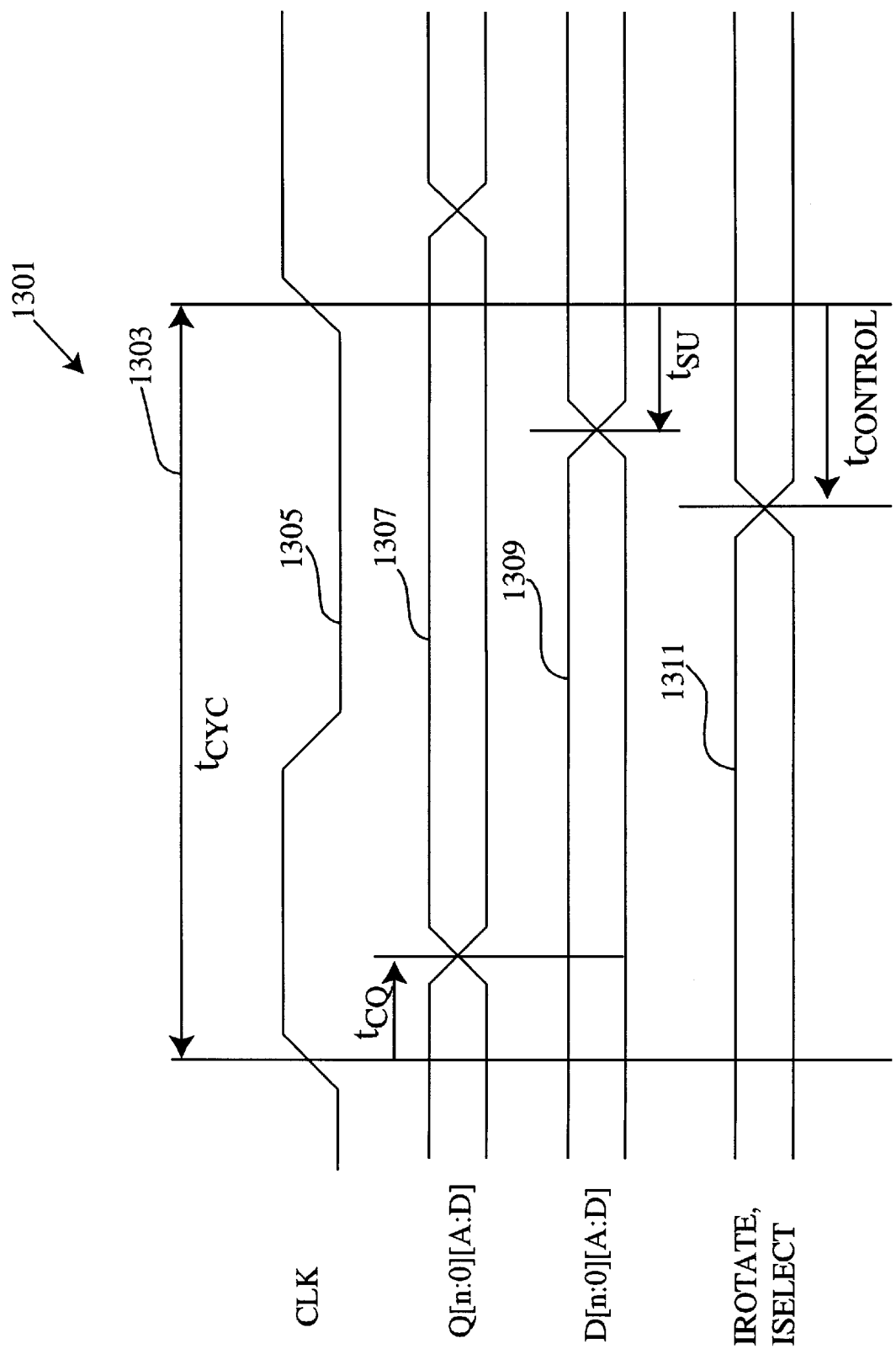
FIG. 13 is a timing diagram for instructions during the fetch cycle within the decode/dispatch block of FIG. 10.

Referring to FIG. 13, timing diagram 1301 for the operation of rotate circuitry 1101 is shown during a single clock cycle '$t_{Cyc}$' 1303. Clock (CLK) signal 1305 is shown together with issue ordered output instruction (Q[n:0][A:D]) signals 1307, physical memory ordered input instruction (D[n:0][A:D]) signals 1309, and IROTATE/ISELECT signals 1311. From Table 11, v '$t_{cq}$' provides a beginning time from which valid instructions are output, '$t_{su}$' provides an ending time for receipt of valid instructions, and '$t_{control}$' provides an ending time for valid control signals.

TABLE 11

Timing Table for SREGnx4D Logic Circuitry

| symbol | name | nom (ns) | max (ns) | note |
|---|---|---|---|---|
| $t_{cq}$ | Data Clock to Q valid | 0.25 | 0.35 | CL =1.0$_p$F |
| $t_{su}$ | Data Setup Time (D[n:0] [A,B,C,D]) | 0.3 | 0.4 | C$_1$<50fF (input cap.) |
| $t_{control}$ | Control Setup Time (IROTATE, ISELECT) | 2.5 | 2.5 | C$_1$<50fF (input cap.) |

Figure 14:
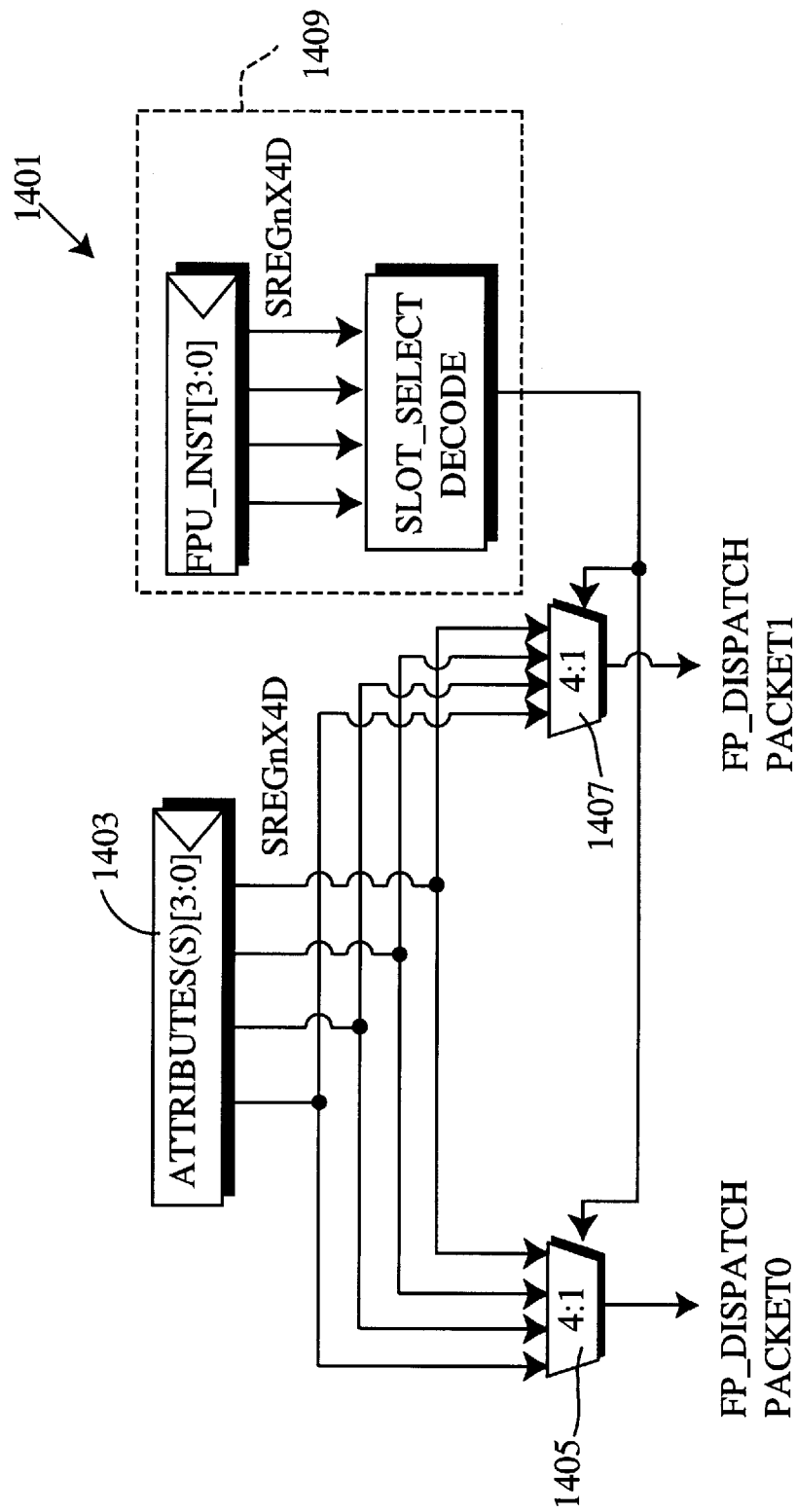
FIG. 14 is an amplified block diagram of dispatch rotation logic circuitry of FIG. 11.

Referring to FIG. 14, a block diagram is shown of floating point (FP) decode/dispatch block 1401 within issue unit 309 and connecting to rotate circuitry 1101. Unlike IMATRIX, BRU, fixed point register file (FXRF), and floating point register file (FPRF) decode/dispatch blocks, the FP decode/dispatch block 1401 (and similarly the FX decode/dispatch block) only require attributes from the first 2 instructions held by the instructions latches which may possibly be dispatched to the respective reservation station associated with an execution unit.

Attributes are decoded and stored in attribute registers 1403. An additional stage of muxing is performed by muxes 1405, 1407 before instruction packets are dispatched during the ISSUE cycle. Prior to dispatch, slot_select logic circuitry 1409 identifies the first two instructions held in the four instruction issue window which are of the correct type for dispatch to the appropriate reservation unit associated with the execution unit. Both the attribute and type (FPU_INST[3:0]) bits from the instruction latches are controlled by IROTATE and ISELECT signals similar to the earlier discussion.

Figure 15B:
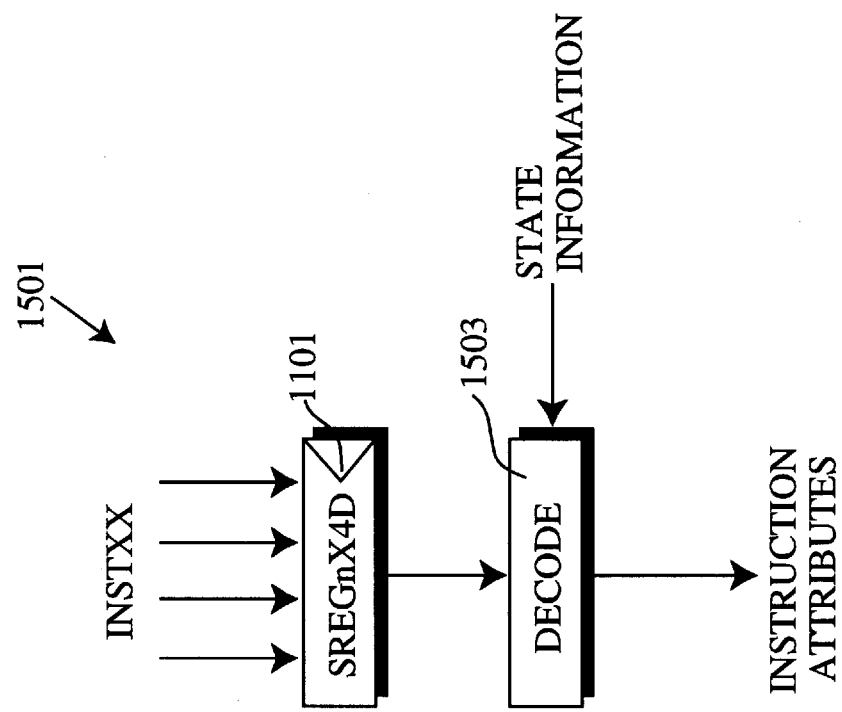
FIG. 15B shows instruction input and output of an alternate embodiment of a decode/dispatch block.
Figure 15A:
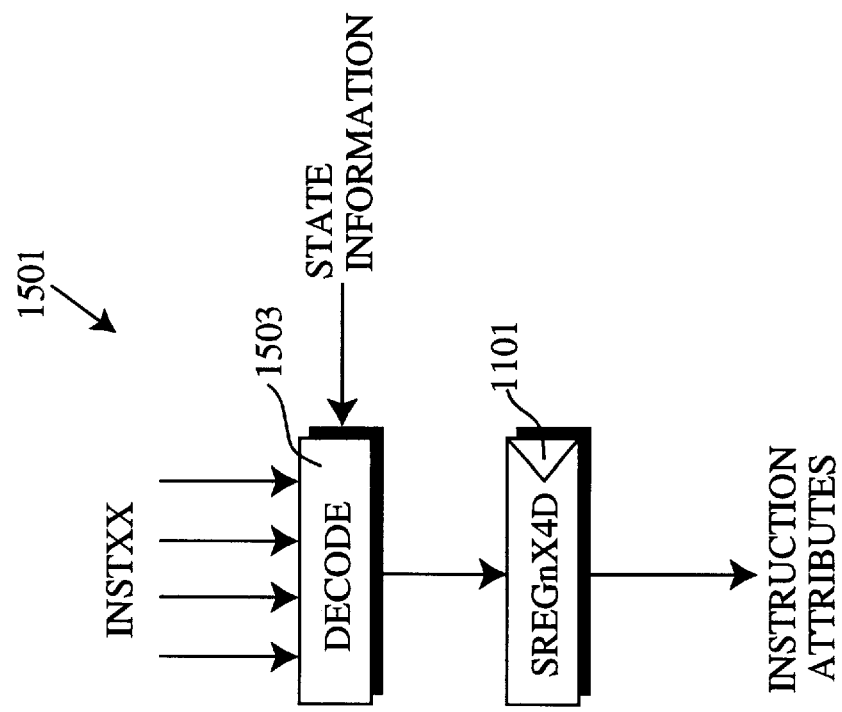
FIG. 15A shows instruction input and output of the decode/dispatch block of FIG. 10.
Figure 15C:
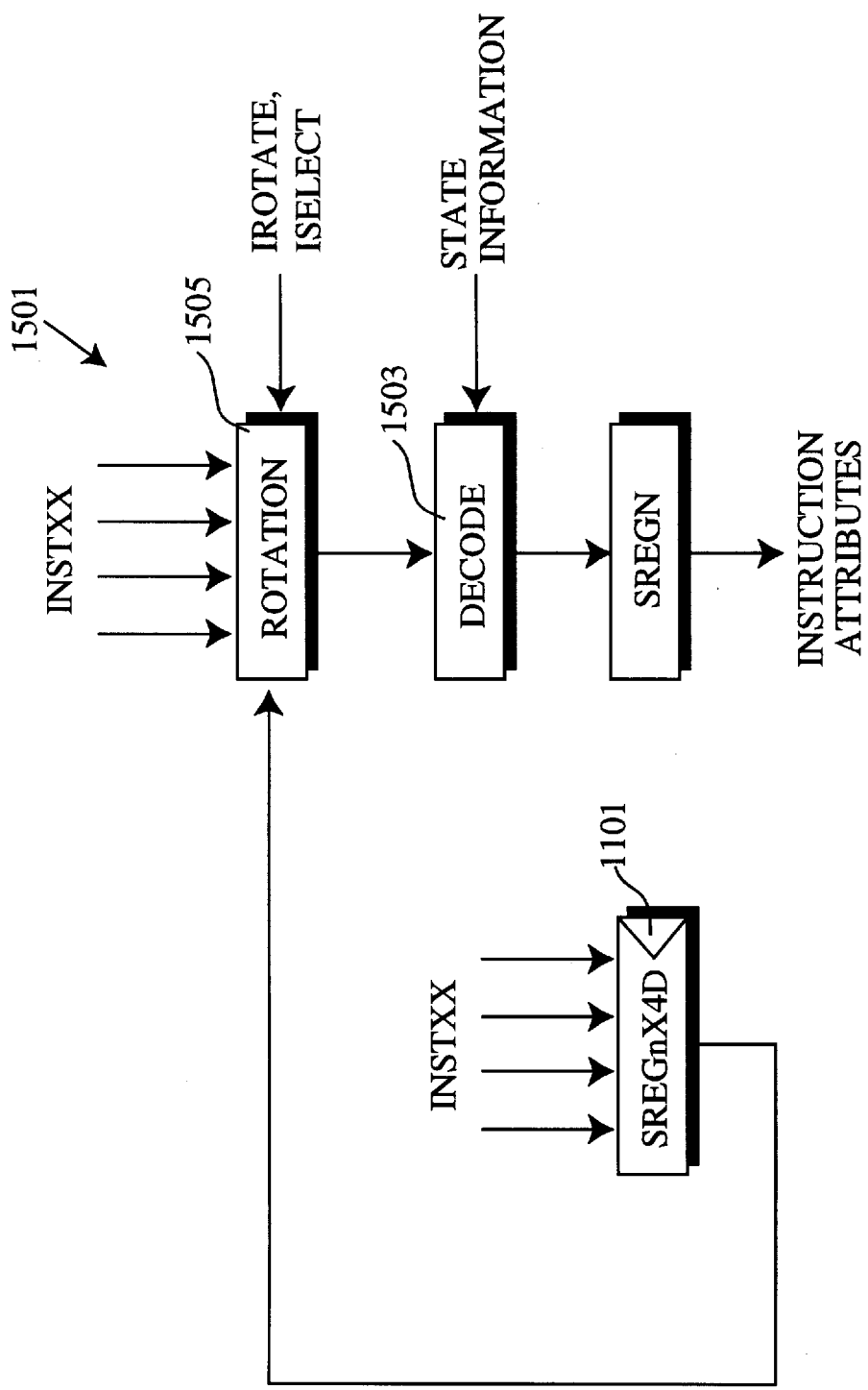
FIG. 15C shows instruction input and output of another embodiment of a decode/dispatch block.

Referring to FIGS. 15A–C, block diagrams are shown of various rotate/decode systems 1501. In some cases, instructions distributed during the fetch cycle and latched in rotate circuitry (SREGnX4Ds) 1101 may become stale. For instance, instructions latched during cycle i are decoded based on state information during cycle i. Since instructions may sit in the latch for multiple cycles, the decoded instruction attributes may become stale or inconsistent. Another example of staleness may occur during an Architectural to Logical (A2L) register tag conversion. During cycle i, state information includes CWP=2. Conversion is performed based on the value of INSTxx in cycle i and new register tags are written into the instruction latch. Two instructions are issued in cycle i+1, when CWP changes to one. Instructions will remain in the instruction latch from the prior cycle and the remaining (or unused) two instructions are rotated to slot0. These instructions are now stale since CWP has changed to one.

In order to avoid the problem of staleness, either the embodiment shown in FIG. 15B or 15C may be utilized. Decode/dispatch system 1501 of FIG. B shows instruction decode block 1503 following the instruction latch of rotate circuitry 1101. Since decode is performed every cycle, there is no problem with inconsistent or stale attributes. This system may delay delivery of instruction attributes in the ISSUE cycle. Alternate system 1501 of FIG. 15B shows rotation logic block 1505 leading instruction decode block 1503. Decode therefore occurs after rotation, which forces re-evaluation of instruction attributes every cycle. Additionally, this system 1501 contemplates a modification of logic circuitry (SREGnX4D) 1101 such that latching of undecoded instruction values occurs in the SREGnX4D registers.

Figure 16:
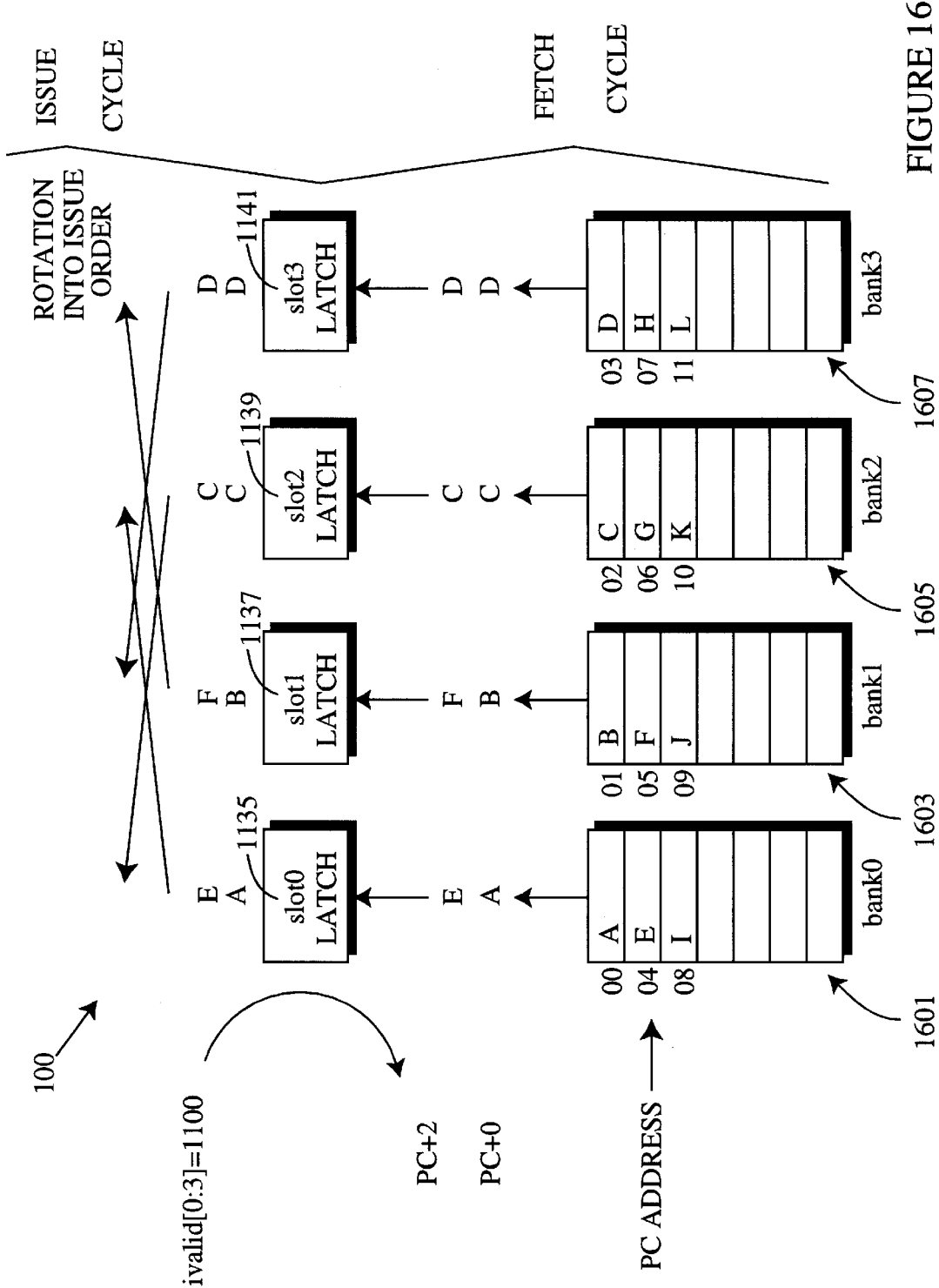
FIG. 16 is a block diagram of memory storage units and latches which shows the flow of instructions during fetch and issue cycles.

Referring to FIG. 16, a block diagram is shown of the movement of instructions within processor 103 during fetch and issue cycles. In a multi instruction issue machine the advance of the PC address depends on the number of instructions issued. For example, in a 4 instruction issue machine, there are four instruction latches or slots (slot0, slot1, slot2 and slot3) 1135, 1137, 1139, 1141. These instruction slots are issued in a priority order in which slot0 has a higher priority than slot1, slot2 or slot3, slot1 has a higher priority than slot2, or slot3 and slot2 has a higher priority than slot3. However, the instructions fetched from the cache are not directed to these instruction slots in the same priority order mentioned above. For example, in a four instruction issue machine there are four cache banks (bank0, bank1, bank2, bank3) 1601, 1603, 1605, 1607. As the PC address advances, the advance has one of the following possibilities: +0, +1, +2, +3, +4, and upon the selection of a given address, the contents of the cache banks are placed on the instruction bus. As shown in FIG. 16, if the PC address advances by +2, the contents of address 02, 03, 04, 05 are placed on the instruction bus. Since address 02 is found in cache bank2 1605, if uncorrected instruction is placed into instruction slot2, while instruction E found in bank0 1601 is placed into slot0 1135 which has a higher priority. This would result in incorrect instruction issuance during the issue cycle. Therefore, prior to the issue cycle, the fetched instructions require rotation from physical memory order into issue order so that the fetched instructions are issued from the correct instruction slots 1135–1141. Referring to Table 12, a simple method is shown for muxing instructions from a fetch order into issue order.

TABLE 12

Issued instructions, PC address and mux controls.

| ivalid | PC address | slot0, slot1, slot2, slot3 |
|---|---|---|
| 0 | 00 | O0, O1, O2, O3 |
| 1 | 00 | O1, O2, O3, N1 |
| 2 | 00 | O2, O3, N1, N2 |
| 3 | 00 | O3, N1, N2, N3 |
| 4 | 00 | N1, N2, N3, N4 |
| 0 | 01 | O0, O1, O2, O3 |
| 1 | 01 | O1, O2, O3, N2 |
| 2 | 01 | O2, O3, N2, N3 |
| 3 | 01 | O3, N2, N3, N4 |
| 4 | 01 | N2, N3, N4, N1 |
| 0 | 10 | O0, O1, O2, O3 |
| 1 | 10 | O1, O2, O3, N3 |
| 2 | 10 | O2, O3, N3, N4 |
| 3 | 10 | O3, N3, N4, N1 |
| 4 | 10 | N3, N4, N1, N2 |
| 0 | 11 | O0, O1, O2, O3 |
| 1 | 11 | O1, O2, O3, N4 |
| 2 | 11 | O2, O3, N4, N1 |
| 3 | 11 | O3, N4, N1, N2 |
| 4 | 11 | N4, N1, N2, N3 |

Note: Ox = OLDx, Nx = NEWx.

An example of the operation of processor 103 with rotate circuitry 1101 during the fetch and issue cycles is shown in Table 13 and 14.

TABLE 13

Example Cache Bank

| bank0 | bank1 | bank2 | bank3 |
|-------|-------|-------|-------|
| 8     | 9     | 10    | 11    |
| 4     | 5     | 6     | 7     |
| 0     | 1     | 2     | 3     |

Table 13 shows the contents of cache 701 stored in four banks.

TABLE 14

Example Fetch/Rotate/Issue

| | | | | |
|---|---|---|---|---|
| 0 | 1 | 2 | 3 | <— 4 instructions fetched (0, 1, 2, 3), 2 instructions issued (0, 1) |
| 4 | 5 | 2 | 3 | <— PC advanced by 2, ISELECT = 1100 |
| 2 | 3 | 4 | 5 | <— IROTATE = 10 |
| 2 | 3 | 4 | 5 | <— 1 inst. gets issued |
| 4 | 5 | 2 | 3 | <— IROTATE_Q = 10, unrotate |
| 4 | 5 | 6 | 3 | <— PC advanced by 1, ISELECT = 0010 |
| 3 | 4 | 5 | 6 | <— IROTATE = 11 |
| 3 | 4 | 5 | 6 | <— inst. gets issued |
| 4 | 5 | 6 | 3 | <— IROTATE_Q = 01 |
| 4 | 5 | 6 | 7 | <— PC advanced by 1, ISELECT = 0001 |

Referring to Table 14, the PC is initially selected at address 00, hence, the contents of cache at this address are 0, 1, 2, 3. These instructions are then latched during the fetch cycle into instruction slot0, slot1, slot2, slot3. The first two instructions (0,1) are issued which permits the PC to be advanced by two or address 10. CPU 103 reads instructions from cache bank 0, bank 1, bank 2, bank 3 which contain instructions: 4, 5, 2, 3, respectively. Based on the ISELECT signal, instructions 4, 5 are muxed by muxes 1111, 1113 and instructions 2, 3 are selected from the un-rotate muxes 1123, 1125. The IROTATE signal then rotates the instructions in issue order, i.e. 2, 3, 4, 5, so that the instructions are latched respectively into instruction slot0, slot1, slot2, slot3. One instruction is issued (instruction 2) during the issue cycle. Hence, PC advances by one. Based on this PC CPU 103 reads instructions from the cache which contain instructions 4, 5, 6, 3, respectively. Based on the ISELECT signal, INSTR06 is muxed by mux 1115 and INSTR04, INSTR05, INSTR03 are selected from un-rotate muxes 1119, 1121, 1125. The IROTATE signal then rotates instructions in issue order: 3, 4, 5, 6. The process continues until all instructions have been fetched and issued.

What is claimed is:

1. In a parallel processing microprocessor having a set of sequentially executable instructions stored in a plurality of addressable storage elements, a method for coordinating the issue of the instructions comprising:
   simultaneously fetching a first set of instructions comprising a first plurality of executable instructions in order from the addressable storage elements, the order defined as a first physical memory order;
   storing the fetched first set of instructions in parallel in the order received from the addressable storage elements;
   sorting the stored first set of instructions into a first issue order;
   issuing at least one executable instruction of the first set of executable instructions for execution with a priority in accordance with the first issue order;
   re-sorting a remaining number of non-issued executable instructions of the first set of executable instructions into the physical memory order;
   simultaneously fetching a second set of executable instructions comprising a second plurality of executable instructions from the storage elements;
   storing the second set of executable instructions in parallel in physical memory order;
   merging the re-sorted non-issued executable instructions of the first set of executable instructions with the second set of executable instructions;
   re-ordering the merged executable instructions into a second physical memory order; and
   sorting the re-ordered executable instructions into a second issue order prior to execution.

2. The method of claim 1 wherein the initial fetching, storing, and sorting, steps are completed during a single clock cycle.

3. An apparatus for coordinating the issue of instructions within a parallel instruction processor including addressable storage containing a set of instructions, the apparatus including:
   a set of pre-sorters coupled to the addressable storage for receiving a fetched sub-set of the instructions;
   a first set of sorters coupled to the pre-sorters and sorting into an issue order a first sub-set of the instructions received in physical memory order that relates to the addressable storage, the issue order being a pre-determined order for executing the set of instructions, and the first sub-set of the instructions being referred to as the issue-ordered instructions;
   a set of latches connected to the first set of sorters and holding the issue-ordered instructions until selected ones of the issue-ordered instructions are dispatched;
   a second set of sorters connecting the latches to the pre-sorters and re-sorting non-selected instructions received from the latches into physical memory order, wherein after physical memory ordering the non-selected instruction being referred to as address-ordered non-selected instructions, the second set of sorters sending the address-ordered non-selected instructions to the pre-sorters wherein the address-ordered non-selected instructions and the fetched instructions are pre-sorted into physical memory order, the pre-sorters sending the pre-sorted address-ordered instructions to the first set of sorters; and
   an unrotate unit, coupled to the first set of sorters and the second set of sorters, for storing an unrotate signal from a previous clock cycle and producing the stored unrotate signal at a current clock cycle to unrotate the instructions from the issue order to the physical memory order.

4. The apparatus as in claim 3 wherein the parallel instruction processor provides a select and rotate signal to the apparatus instructing selection of instructions received by the pre-sorters and first sorters, respectively, the addressable storage being organized into a set of banks, the set of instructions being sequentially stored in execution order across the banks, the apparatus including:
   a set of parallel storage elements connecting the addressable storage to the pre-sorters, receiving the fetched sub-set of the instructions from the addressable storage, and delivering the fetched sub-set of the instructions to the pre-sorters; each of the parallel storage elements being associated with a respective one of the banks and a respective one of the pre-sorters; and the unrotate unit receiving the rotate signal for generating an unrotate signal to reverse the selection of instructions by the first sorters, and for supplying the unrotate signal to the second sorters instructing selection of instructions received by the second sorters;

each of the sorters receiving an input instruction from an associated one of the storage elements and one of the second sorters, the select signal instructing the selection of one of the received instructions output to the first sorters;

each of the first sorters receiving instructions from each of the presorters, the rotate signal instructing the selection of one of the received instructions output to an associated one of the latches;

each of the second sorters receiving instructions from each of the latches, the unrotate signal instructing the selection of one of the received instructions output to an associated one of the pre-sorters.

5. A parallel, instruction processing system including:

an external memory containing a set of instructions having a pre-determined execution order in addressable memory locations;

a processor connecting to the external memory and processing selected of the instructions in parallel; and an input/output device connecting to the processor, and receiving information from and sending information to the processor;

the processor including:
  an issue unit connecting to the memory and coordinating issue of the instructions, the issue unit including:
    a set of pre-sorters coupled to the addressable storage for receiving a fetched sub-set of the instructions;
    a first set of sorters coupled to the set of pre-sorters and sorting a first sub-set of the instructions received in physical memory order into an issue order, the physical memory order relating to the addressable storage, the issue order being a pre-determined order for executing the set of instructions, after ordering, the first sub-set of the instructions being referred to as the issue-ordered instructions;
    a set of latches connecting to the first set of sorters and holding the issue-ordered instructions until selected of the issue-ordered instructions are dispatched;
    a second set of sorters connecting the latches to the pre-sorters and re-sorting non-selected instructions received from the latches into physical memory order, wherein after physical memory ordering the non-selected instruction being referred to as address-ordered non-selected instructions, the second set of sorters sending the address-ordered non-selected instructions to the pre-sorters wherein the address-ordered non-selected instructions and the fetched instructions are pre-sorted into physical memory order, the pre-sorters sending the pre-sorted address-ordered instructions to the first set of sorters; and
    an unrotate unit, coupled to the first set of sorters and the second set of sorters, for storing an unrotate signal from a previous clock cycle and producing the stored unrotate signal at a current clock cycle to unrotate the instructions from the issue order to the physical memory order.

6. The system as in claim 5 wherein the processor provides a select and rotate signal to the issue unit instructing selection of instructions received by the pre-sorters and first sorters, respectively, the addressable storage is organized into a set of banks, the set of instructions is sequentially stored in execution order across the banks, the issue unit including:

a set of parallel storage elements connecting the addressable storage to the pre-sorters, receiving the fetched sub-set of the instructions from the addressable storage, and delivering the fetched sub-set of the instructions to the pre-sorters, each of the parallel storage elements being associated with a respective one of the banks and a respective one of the pre-sorters; and the unrotate unit receiving the rotate signal, developing an unrotate signal to reverse the selection of instructions by the first sorters, and providing the unrotate signal to the second sorters instructing selection of instructions received by the second sorters;

each of the sorters receiving an input instruction from an associated one of the storage elements and one of the second sorters, the select signal instructing the selection of one of the received instructions output to the first sorters;

each of the first sorters receiving instructions from each of the presorters, the rotate signal instructing the selection of one of the received instructions output to an associated one of the latches;

each of the second sorters receiving instructions from each of the latches, the unrotate signal instructing the selection of one of the received instructions output to an associated one of the pre-sorters.

* * * * *